United States Patent
Popovic

(10) Patent No.: US 7,539,375 B2
(45) Date of Patent: May 26, 2009

(54) OPTICAL COUPLED RESONATOR STRUCTURES BASED ON LOOP-COUPLED CAVITIES AND LOOP COUPLING PHASE

(75) Inventor: Milos Popovic, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/800,446

(22) Filed: May 4, 2007

(65) Prior Publication Data

US 2008/0273835 A1    Nov. 6, 2008

(51) Int. Cl.
*G02B 6/26* (2006.01)
*G02B 6/10* (2006.01)

(52) U.S. Cl. .............................. 385/32; 385/39; 385/50; 385/129

(58) Field of Classification Search ................... 385/32, 385/50, 129, 39
See application file for complete search history.

(56) References Cited

U.S. PATENT DOCUMENTS

| | | | |
|---|---|---|---|
| 3,558,213 A | | 1/1971 | Marcatili |
| 4,852,117 A | * | 7/1989 | Po ............................... 372/97 |
| 6,052,495 A | * | 4/2000 | Little et al. ..................... 385/2 |
| 6,289,151 B1 | * | 9/2001 | Kazarinov et al. ............ 385/32 |
| 7,102,469 B2 | * | 9/2006 | Kim et al. .................... 333/204 |
| 7,145,660 B2 | * | 12/2006 | Margalit et al. .............. 356/477 |
| 7,215,848 B2 | * | 5/2007 | Tan et al. ....................... 385/32 |
| 7,292,751 B2 | * | 11/2007 | Popovic ........................ 385/32 |
| 2004/0008942 A1 | * | 1/2004 | Scheuer et al. ................ 385/39 |
| 2006/0239614 A1 | | 10/2006 | Montgomery et al. | |
| 2007/0211992 A1 | * | 9/2007 | Chu et al. ...................... 385/32 |

FOREIGN PATENT DOCUMENTS

| | | |
|---|---|---|
| EP | 1024378 | 8/2000 |
| JP | 2001-194160 | 7/2001 |
| WO | WO-03/043247 | 5/2003 |
| WO | WO-2006/076585 | 7/2006 |

OTHER PUBLICATIONS

Bethe, "Theory of Diffraction by Small Holes" Phys Rev, vol. 66, Nos. 7-8, (Oct. 1994), 163-182.
Fan et al., "Theoretical Analysis of Channel Drop Tunneling Processes," Phys. Rev. B, vol. 59, No. 2, (Jun. 15, 1999), 15882-15892.

(Continued)

*Primary Examiner*—Charlie Peng
(74) *Attorney, Agent, or Firm*—Goodwin Procter LLP

(57) ABSTRACT

A resonator structure includes an input waveguide and an output waveguide. In one embodiment, the resonator structure also includes at least one resonator that couples the input waveguide to the output waveguide and a directional coupler that optically couples the input waveguide to the output waveguide. In another embodiment, the resonator structure includes a plurality of ring resonators that couple the input waveguide to the output waveguide. The plurality of ring resonators include a sequence of ring resonators that form a coupling loop. Each ring resonator in the sequence is coupled to at least two other ring resonators in the sequence and the first ring resonator in the sequence is coupled to the last ring resonator in the sequence so as to form the coupling loop.

18 Claims, 21 Drawing Sheets

OTHER PUBLICATIONS

Haus et al., "Broadband Hitless Bypass Switch for Integrated Photonic Circuits," IEEE Photonic Technology Letters, vol. 18, No. 10, (May 15, 2006), 1137-1139.

Khan, et al. "Mode-Coupling Analysis of Multiple Symmetric Resonant Add/Drop Filters," IEEE Journal of Quantum Electronics, vol. 35, No. 10, (Oct. 1999), 1451-1460.

Khurgin, et al., "Expanding the Bandwidth of Slow-Light Photonic Devices Based on Coupled Resonators," Optics Letters, vol. 30, No. 5, (Mar. 1, 2005), 513-515.

Little et al., "Filter Synthesis for Periodically Coupled Microring Resonators," Optics Letters, vol. 25, No. 5, (Mar. 1, 2000), 344-346.

Little et al., "Microring Resonator Channel Dropping Filters," Journal of Lightwave Technology, (1997), 15, 998-1005.

Madsen, "Efficient Architectures for Exactly Realizing Optical Filters with Optimum Bandpass Designs," IEEE Photonics Technology Letters, vol. 10, No. 8, (Aug. 1998), 1136-1138.

Manolatou, et al., "Coupling of Modes Analysis of Resonant Channel Add-Drop Filters," IEEE Journal of Quantum Electronics, vol. 35, No. 9, (Sep. 1999), 1322-1331.

Manolatou et al., "High-Density Integrated Optics" Journal of Lightwave Technology, vol. 17, No. 9, (Sep. 1999), 1682-1692.

McDonald, "Electric and Magnetic Coupling through Small Apertures in Shield Walls of Any Thickness," IEEE Transactions on Microwave Theory and Techniques, vol. MTT-20, No. 10, (Oct. 1972), 689-695.

Melloni et al., "Synthesis of Direct-Coupled-Resonators Bandpass Filters for WDM Systems Lightwave Technology," Journal of Lightwave Technology, vol. 20, No. 2, (2002), 296-303.

Poon, "Wavelength-Selective Reflector based on a Circular Array of Coupled Microring Resonators," IEEE Photonics Technology Letters, vol. 16, No. 5, (May 2004), 1331-1333.

Rhodes, "A Low-Pass Filter Prototype Network for Microwave Linear Phase Filters," IEEE Trans. Microwave Theory Tech., vol. MTT-18, No. 6, (Jun. 1970), pp. 290-301.

Suh et al. "Temporal Coupled-Mode Theory and the Presence of Non-Orthogonal Modes in Lossless Multimode Cavities," IEEE Journal of Quantum Electronics, vol. 40, No. 10, (Oct. 2004), pp. 1511-1518.

Xu et al., "Experimental Realization of an On-Chip All-Optical Analogue to Electromagnetically Induced Transparency," Physical Review Letters, 96, Article 123901, (2006), 1-4.

Yanik et al., "Stopping Light All Optically," Phys Rev Lett, vol. 92, No. 8, (Feb. 27, 2004), Article 083901, 1-4.

Yariv et al., "Coupled-Resonator Optical Waveguide: a Proposal and Analysis," Optics Letters, vol. 24, No. 11, (Jun. 1, 1999), 711-713.

Invitation to Pay Additional Fees and Partial International Search for corresponding International Application No. PCT/US2008/00330, mailed Jul. 30, 2008, 5 pages.

Chremmos et al. "Properties of Regular Polygons of Coupled Microring Resonators," Applied Optics Optical Society of America, vol. 46, No. 31, Nov. 1, 2007, pp. 7730-7738.

Darmawan et al. "Nested Ring Mach-Zender Interferometer," Optics Express Opt. Soc. America, vol. 15, No. 2, Jan. 2001, pp. 437-448.

International Search Report for corresponding International Application No. PCT/US2008/003300, mailed Oct. 14, 2008, 8 pages.

Written Opinion for corresponding International Application No. PCT/US2008/003300, mailed Oct. 14, 2008, 10 pages.

* cited by examiner

−VE LOOP-COUPLING

+VE LOOP-COUPLING

"POSITIVE" (CAPACITIVE) 4-WAY
COUPLING BETWEEN ALL CAVITIES

"NEGATIVE" (SIMULATED INDUCTIVE)
COUPLING BETWEEN CAVITY PAIR 62,68

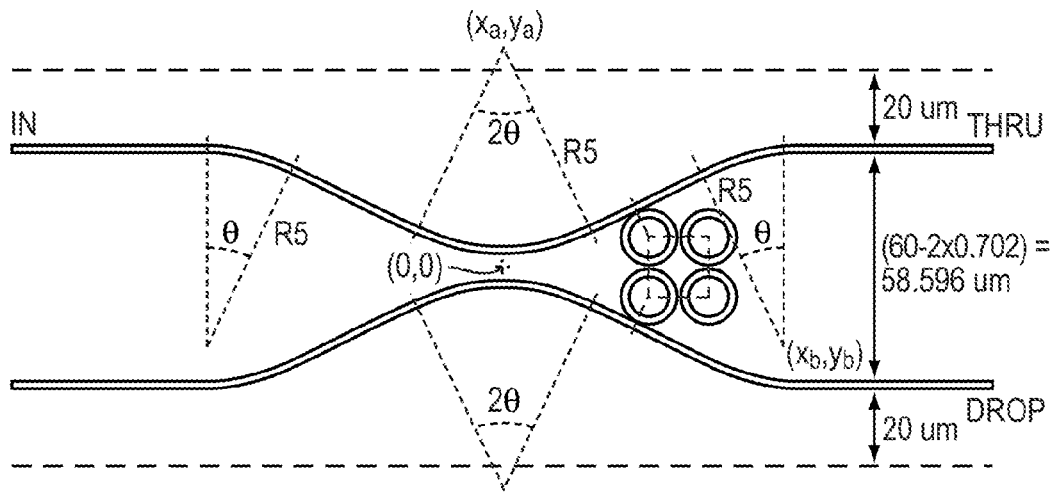
FIG. 18A
BUS DIMENSIONS:
WIDTH = 702 nm
$(x_a, y_a) = (0, +55)$ MICRONS
$(x_b, y_b) = (+74.1211, -20)$
$R5_{inner,outer} = (49.298, 50)$ MICRONS
$\theta = 25°$
RING DIMENSIONS ROUNDED TO 6 nm:
WIDTH = 900 nm
$(R1 = R2 = R3 = R4)_{inner,outer} = (7.098, 7.998)$ MICRONS
$(x_1, y_1) = (+37.482, +8.352)$
$(x_2, y_2) = (+53.874, +7.974)$
$(x_3, y_3) = (+53.880, -8.460)$
$(x_4, y_4) = (+37.482, -8.352)$
GAPS AND ANGLES AS BACKUP:
$(g_{in}, g_{12}, g_{23}, g_{34}, g_{out}, g_{14}) = (0.1198\ 0.4022\ 0.4402\ 0.4022\ 0.1198\ 0.7084)$ MICRONS
$(\phi_1, \phi_2, \phi_3, \phi_4) = (88.68, 91.33, 89.61, 90.38)$ DEGREES
FIG. 18B
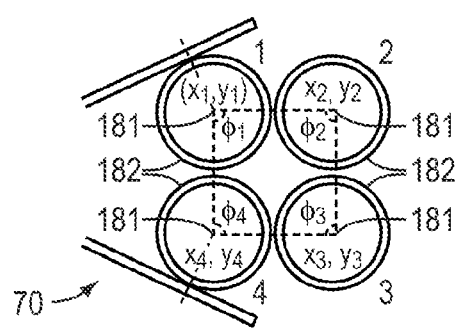
FIG. 18C

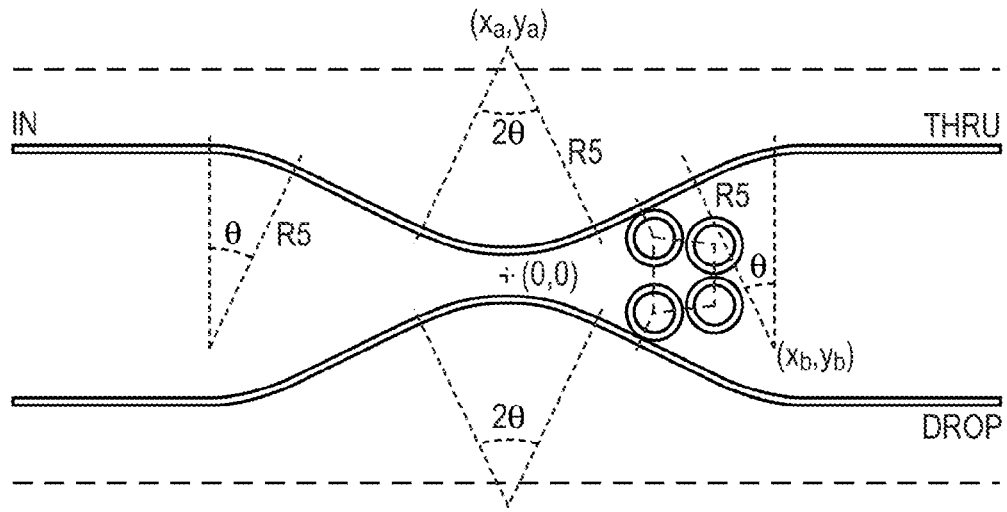
FIG. 19A
BUS DIMENSIONS:
WIDTH = 702 nm
$(x_a, y_a) = (0, +55)$ MICRONS
$(x_b, y_b) = (+74.1211, -20)$
$R5_{inner, outer} = (49.298, 50)$ MICRONS
$\theta = 25^\circ$
RING DIMENSIONS ROUNDED TO 6 nm:
WIDTH = 900 nm
$(R1 = R2 = R3 = R4)_{inner, outer} = (7.098, 7.998)$ MICRONS
$(x_1, y_1) = (+42.018, +10.464)$
$(x_2, y_2) = (+58.260, +8.232)$
$(x_3, y_3) = (+58.260, -8.232)$
$(x_4, y_4) = (+42.018, -10.464)$
GAPS AND ANGLES AS BACKUP:
$(g_{in}, g_{12}, g_{23}, g_{34}, g_{out}, g_{14}) = (0.1222\ 0.4022\ 0.4655\ 0.4022\ 0.1222\ 4.9319)$ MICRONS
$(\phi_1, \phi_2, \phi_3, \phi_4) = (82.17, 97.83, 97.83, 82.17)$ DEGREES
FIG. 19B
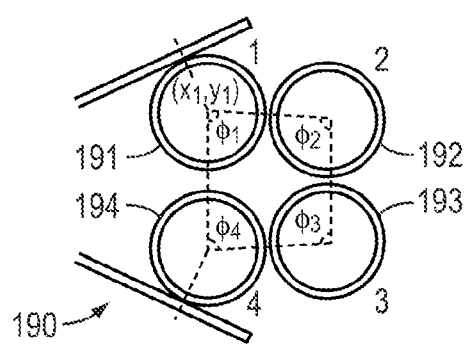
FIG. 19C

US 7,539,375 B2

OPTICAL COUPLED RESONATOR STRUCTURES BASED ON LOOP-COUPLED CAVITIES AND LOOP COUPLING PHASE

STATEMENT REGARDING FEDERALLY SPONSORED RESEARCH OR DEVELOPMENT

This invention was made with government support awarded by the U.S. Army under Grant Number W911NF-06-1-0449. The U.S. Government has certain rights in the invention.

TECHNICAL FIELD

The invention generally relates to optical resonator structures. More particularly, the invention relates to integrated optical (microphotonic) resonant structures that comprise loop-coupled cavities having an associated loop coupling phase, and may include, for example, microring resonators, photonic crystal microcavities, and standing wave dielectric resonators.

BACKGROUND

Coupled resonators have previously been used in optics, and particularly in integrated optics, for the design of various amplitude and phase filtering structures. Previous work on coupled-cavity resonant structures includes: series-coupled-cavity (SCC) structures (FIG. 1), parallel-coupled-cavity (PCC) filters (FIG. 2), and Mach-Zehnder all-pass decomposition (AD) resonant structures (FIG. 3).

Series-coupled-cavity structures (also referred to as coupled-resonator optical waveguides—CROWs—in slow-light literature), such as the structure 310 shown in FIG. 1, may be used as channel add-drop filters and slow-wave structures. The structure 310 includes a chain of linearly coupled optical cavities 311-313, an input waveguide 314 coupled to the first cavity 311, and an output waveguide 315 coupled to the last cavity 313. A drawback of SCC structures is that they only support all-pole spectral responses in the input-to-drop-port response, with no control over the transmission zeros (all located at effectively infinite frequency detuning from the center wavelength). When making a comparison for a given resonant order (i.e., a fixed number of used cavities, or used resonant modes, in the structure), all-pole responses, such as maximally-flat (Butterworth) and equiripple (Chebyshev), are known in circuit theory to be suboptimal in their selectivity in comparison to pole-zero filters, such as elliptic and quasi-elliptic designs. Another drawback is that such all-pole structures are minimum-phase and are, as is well known in signal processing, constrained to have their amplitude and phase response uniquely related by the Kramers-Kronig (Hilbert transform) relation. This means that a flat-top amplitude response implies a dispersive phase response, and high-order, selective (square-passband) filters are as a result highly dispersive. The dispersion can substantially distort an optical signal passing through the filter, so additional dispersion compensating (all-pass filter) structures must ordinarily follow such filters to permit reasonably high spectral efficiency.

With reference to FIG. 2, parallel-coupled-cavity structures 320 have been used as channel filters and for demonstration of light slowing. The structure 320 includes a pair of parallel optical waveguides 321, 322 and a set of optical resonant cavities 323-325. Each of the cavities 323-325 is typically individually coupled to the input waveguide 321 and to the output waveguide 322, while no one of the cavities 323-325 is substantially coupled directly to another cavity 323-325. Parallel-coupled-cavity structures 320 also permit flat-top filter responses in the input-to-drop-port response, i.e., where an input signal enters one waveguide and an output (dropped-wavelength) signal exits from the second waveguide. A drawback of these structures 320 is that there is only one resonator 323-325 at any point separating the input waveguide 321 and output waveguide 322 (in the sense of optical coupling), and higher-order responses may be obtained due to phase-aligned constructive interference of the many cavities 323-325. If substantial variations in the design parameters are introduced due to fabrication errors, the drop port response rejection can be severely reduced, and in the limit of substantial variations may approach a first-order rolloff. A second drawback is that parallel-coupled-cavity structures 320 have interferometric paths between the cavities 323-325 and, as such, their resonant wavelengths are difficult to tune while maintaining the phase relationships of the interferometric paths. The parallel-coupled-cavity structures 320 are also difficult to switch on and off in a hitless manner.

With reference to FIG. 3, a typical Mach-Zehnder all-pass decomposition (AD) structure 330 includes a Mach-Zehnder (MZ) interferometer formed of two waveguides 331, 332 having a first 3 dB coupler 333 and a second 3 dB coupler 334, and resonant cavities 335 in an all-pass configuration in one or the other waveguide 331, 332 inside the interferometer, i.e., between the first and the second 3 dB couplers 333, 334. One advantage of the structure 330 over an SCC filter, such as the filter 310 illustrated in FIG. 1, is that the structure 330 permits optimally sharp, "elliptic" filter response designs. A drawback of these designs, however, is that they require a precise 3 dB coupling (50:50% splitting) in each directional coupler 333, 334, at all wavelengths in the wavelength range of operation. Deviation from 3 dB coupling leads to reduction of the signal rejection ratio in the drop port 336, which appears as a flat "noise floor" because a fraction of light at all wavelengths ventures into the drop port 336. This requirement makes such filters challenging to fabricate and control in practice, as they require an accurate 3 dB coupling over the entire spectrum of operation of the filter (in and out of band).

Referring to FIG. 4, a SCC structure 40 based on standing-wave resonators 41-44 is shown, as known in the prior art. The input port 45 and through port 46 are the incident (incoming) and reflected (outgoing) waves in the top waveguide, respectively, while the drop port 47 is the outgoing wave in the bottom waveguide. An important advantage of microring resonator structures such as the structure 310 depicted in FIG. 1 is that they, by their traveling-wave nature, inherently separate the incoming and outgoing waves into separate waveguide ports. This makes each port automatically "matched" (i.e., matched impedance), each port having no substantial reflection signal when an incident signal is sent into the port. Such structures that inherently have matched ports (as in FIG. 1) can be called "optical hybrids", and they eliminate the need for optical isolators and circulators.

SUMMARY OF THE INVENTION

The optical structures of the present invention solve the problem of providing transmission zeros, with positions in frequency (or, more generally, on the complex-frequency plane) controllable in design, in the drop-port response(s) of a resonant structure. The inventive optical structures do not require the use of 3 dB couplers or any strong direct coupling between the input and output waveguide, and therefore have spectral responses, including rejection ratios, that are highly insensitive to fabrication errors and design nonidealities, in contrast to AD structures. The inventive structures also allow non-minimum-phase responses, including flat-top, linear-phase filters, unlike SCC structures which are limited to all-pole responses.

In one embodiment, the structures of the present invention, which include at least an input port and a drop port, enable the design of spectral responses with transmission zeros in the drop port (at real and complex frequency detunings from resonance). This enables optimally sharp filter responses (using real-frequency zeros), and dispersion-engineered spectral responses (using complex-frequency zeros). The latter responses are non-minimum-phase and therefore are not subject to the well known Kramers-Kronig (Hilbert transform) constraint between the amplitude and phase spectral responses. In particular, the structures of the present invention permit the design of spectral responses with passbands having a flat-top amplitude response at the same time as a nearly linear phase response, without the need for additional dispersion compensation following the structure (e.g., by all-pass filters). Such responses are optimal, in the sense that a minimum number of resonant cavities are used for a given amplitude response selectivity and phase linearity.

Applications of the disclosed structures include: i) channel add-drop filters for high spectral efficiency photonic networks for telecommunication applications as well as for intrachip photonic networks for next-generation microprocessors; ii) dispersion-compensated filters; iii) slow-wave resonator-based structures for sensors, channelized modulators, amplifiers, wavelength converters, and coupled-cavity nonlinear optics in general. Another example application is in microwave photonics, where the flat-top, linear-phase microphotonic filters may be used in combination with an optical modulator to replace microwave satellite transponder filters, thereby reducing the size and weight of the payload. The flat-top, linear-phase microphotonic filters may also be used in terrestrial microwave filtering, such as in spectral slicing filters in cellular telephone towers.

The optical structures of the present invention generally include one or more optical cavities and at least two waveguides. In one embodiment, an input port and a through (reflection) port are defined in the first waveguide, and a drop (transmission) port is defined in the second waveguide. Each of the first and the second waveguides may be coupled to at least one optical cavity, and the direct coupling between the first and second waveguides, i.e., the optical power coupled at a wavelength far from the resonance frequency of any optical cavity in the system, is, in one embodiment, less than about 50%. Preferably, the direct coupling between the first and second waveguides is less than about 10%. However, the direct coupling between the first and second waveguides may or may not be substantially negligible, as dictated by the particular design.

In various embodiments, the optical structures of the present invention include one or more of the following features:

1) The use of cavity modes having at least one node in the spatial electric field pattern at any one time (referred to herein as "high-order cavity modes").
2) A plurality of cavities coupled in a loop, thereby forming a "coupling loop" and defining an associated loop coupling coefficient (LCC).
3) For structures exhibiting feature 2), a further defined phase of the LCC, referred to as the loop coupling phase (LCP). The LCP of the inventive structures may be approximately 0, approximately 180 degrees, or any other value between 0 and 360 degrees. The LCP may be chosen by an appropriate arrangement of the cavity mode geometry. In the case of microring resonators, the LCP may be chosen by tilting the geometry of the coupled cavity loop by an appropriate angle in the plane of the resonators.
4) A non-zero (non-negligible) direct coupling between the input waveguide and the output waveguide, but still one that is less than about 50%, and is preferably less than about 10%, and even more preferably is less than about 1%.

The development of optical filter designs based on a family of resonator structures incorporating one or more of the above features, and using appropriate energy coupling coefficients between resonant cavities and between cavities and ports, permits the realization of various filter responses having transmission zeros. For example, optimally sharp filters, including elliptic and quasi-elliptic filters, and dispersion engineered filters, including nearly linear phase filters, may be realized.

In general, in one aspect, the invention features a loop-coupled resonator structure that includes an input waveguide, an output waveguide, and a plurality of ring resonators that couple the input waveguide to the output waveguide. The plurality of ring resonators include a sequence of ring resonators that form a coupling loop. Each ring resonator in the sequence is coupled to at least two other ring resonators in the sequence and the first ring resonator in the sequence is coupled to the last ring resonator in the sequence so as to form the coupling loop. As used herein, the term "ring resonator" generally refers to any resonator that is formed by wrapping a waveguide into a closed loop. Accordingly, ring resonators include, for example, circular microring resonators and racetrack resonators.

In various embodiments of this aspect of the invention, the coupling loop has an associated loop coupling coefficient, which itself has an associated loop coupling phase. The loop coupling phase may be approximately 0 degrees, approximately 180 degrees, or another amount. The coupling loop may include four ring resonators and each of the ring resonators of the coupling loop may include a substantially equal ring radii. In one embodiment, the four ring resonators forming the coupling loop are each centered at a different vertex of a rectangle. In another embodiment, the geometry of the coupling loop is tilted so that the four ring resonators forming the coupling loop are each centered at a different vertex of a parallelogram. For example, the geometry of the coupling loop may be tilted by an angle equal to approximately ⅛ of the guided wavelength of a ring resonator in the coupling loop.

In yet another embodiment, half of the plurality of ring resonators are arranged in a first row and half of the plurality of ring resonators are arranged in a second row adjacent to the first row. In such an embodiment, each ring resonator in the first row may be coupled to at least one other ring resonator in the first row and to a ring resonator in the second row, and each ring resonator in the second row may be coupled to at least one other ring resonator in the second row and to a ring resonator in the first row. The inter-row couplings (for example, the inter-row energy coupling coefficients) of the resonators may be weaker than the intra-row couplings of the resonators.

At least one of the plurality of ring resonators may be a microring resonator or, alternatively, a racetrack resonator. Moreover, at least one of the plurality of ring resonators may include magnetooptic media. In various embodiments, the coupling loop includes an even number of ring resonators. In such a case, at least one ring resonator (and, more specifically, every ring resonator) in the coupling loop is operated to only propagate light in a single direction within the resonator. In still another embodiment, the output waveguide includes a drop port and the loop-coupled resonator structure has a spectral response that includes transmission zeros in the drop port.

In general, in another aspect, the invention features an optical resonator structure that includes an input waveguide, an output waveguide, at least one resonator that couples the input waveguide to the output waveguide, and a directional coupler that optically couples the input waveguide to the output waveguide.

In various embodiments of this aspect of the invention there is a phase shift in the input waveguide light propagation between the directional coupler and the at least one resonator, relative to that between the directional coupler and the at least one resonator in the output waveguide. Alternatively, the relative phase shift may be introduced in the output waveguide between the directional coupler and the at least one resonator. Additionally, a length of the input waveguide between the directional coupler and a point at which the at least one resonator couples to the input waveguide may be substantially equal to a length of the output waveguide between the directional coupler and a point at which the at least one resonator couples to the output waveguide. The relative phase shift introduced may be implemented, for example, as a small waveguide length difference (e.g. half of the guided wavelength long, for a 180° relative phase shift) between the input and output waveguide, between the directional coupler and resonators, or as a thermally-actuated phase shifter.

In one embodiment, a plurality of resonators couple the input waveguide to the output waveguide. The plurality of resonators may include, for example, a sequence of resonators that form a coupling loop. Each resonator in the sequence may be coupled to at least two other resonators in the sequence and the first resonator in the sequence may be coupled to the last resonator in the sequence so as to form the coupling loop.

The optical coupling between the input waveguide and the output waveguide introduced by the directional coupler may be substantially broadband over several passband widths. For example, it may be broadband over at least three passband widths, or over at least ten passband widths. In another embodiment, the output waveguide includes a drop port and the optical resonator structure has a spectral response that includes transmission zeros in the drop port.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments and implementations are described with reference to the following drawings, in which:

FIGS. 18a-c illustrate an exemplary physical realization of the 4$^{th}$-order loop-coupled structure depicted in FIG. 7;

FIGS. 19a-c illustrate an exemplary physical realization of a 4$^{th}$-order standard SCC filter;

DETAILED DESCRIPTION

In general, the present invention pertains to optical-coupled resonator structures that are based on loop-coupled cavities and loop coupling phase.

Figure 5A:
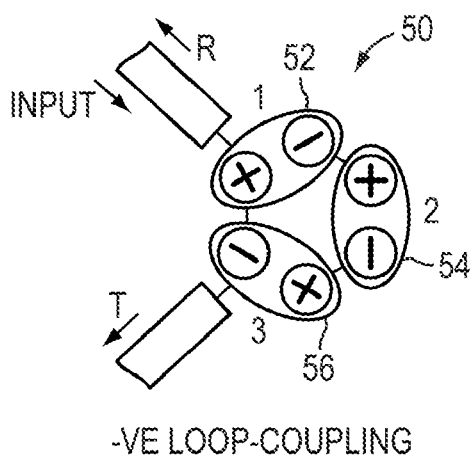
FIG. 5a illustrates a third-order loop-coupled resonant structure with negative LCC in accordance with an embodiment of the invention.
Figure 5B:
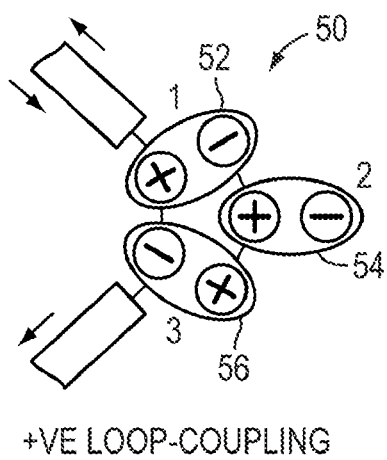
FIG. 5b illustrates a third-order loop-coupled resonant structure with positive LCC in accordance with an embodiment of the invention.

Loop coupling of cavities may be understood as follows. FIGS. 5a-b each show one embodiment of a third-order loop-coupled resonant structure 50 (i.e., a resonant structure having three cavities or, more rigorously, three resonant modes in use near the wavelength of interest, which may or may not be substantially located in separate cavities), based on standing wave cavities. The structure 50 includes a single coupling loop. A (non-trivial) coupling loop is defined as a path through a sequence of mutually coupled cavities that begins with an arbitrary cavity and that ends at that same arbitrary cavity after traversing at least two other cavities, but without the path being retraced. For example, the coupling loop of FIGS. 5a and 5b can be written as the sequence 52-54-56-52, with numbers referring to the cavities. Sequences representing non-trivial coupling loops are not palindromes, i.e., are not symmetric with respect to the middle number.

For each coupling loop, a loop coupling coefficient (LCC) may be defined. Two cavity modes may be coupled via evanescent field coupling across a gap or via radiative field coupling via a traveling-wave coupling pathway. Evanescent coupling may be understood as follows. For each pair of mutually coupled cavities, an energy coupling coefficient (ECC), with units of rad/s, represents the rate of energy amplitude coupling in time between the two cavities, and is the standard measure of coupling between cavities under the commonly used coupled mode theory in time formalism. Then, the LCC of a coupling loop is defined as the product of ECCs around the loop. Strictly, the LCC is a vector, with a complex magnitude indicating the product of ECCs, and whose direction indicates the sense in which the loop is traversed according to a preset convention, for example according to the well-known right-hand-rule used in electrical engineering. In the following discussion, the direction of the loop is understood from the illustrations and is omitted in the LCC value, where only the magnitude is considered. For example, if the ECC from cavity i to cavity j is $\mu_{i,j}$, then the LCC for the structure 50 depicted in FIGS. 5a and 5b is $\mu_{54,52} \mu_{56,54} \mu_{52,56}$.

Since the LCC is a complex number, a loop-coupling phase (LCP) associated with each LCC may be defined as the phase of the LCC. As with any phase, the LCP has a value modulo 360°, i.e., modulo $2\pi$ radians. The LCP has a physical significance, which is illustrated in FIGS. 5a and 5b. FIG. 5a shows a coupling loop with a 180° ($\pi$ radian) LCP, which is also referred to as negative loop coupling. The LCP can be ascertained by assuming the illustrated two-lobe electric field patterns for the cavity modes 52, 54, 56 (showing areas of positive and negative electric field), with a choice of reference time that makes the field phasor distribution real. Overlap integrals of modes of adjacent cavities with the (generally positive) dielectric distribution perturbation gives the ECCs, $\mu_{i,j}$, all to be negative real numbers, and thus their product, the LCC, is also negative (because there is an odd number of cavities 52, 54, 56, and thus an odd number of ECCs, $\mu_{i,j}$).

It should be noted that in the microwave engineering literature, reference is often made to a positive or negative coupling coefficient—this refers to the sign of each ECC, $\mu_{i,j}$. Since the sign of each cavity's (uncoupled) resonant mode pattern is arbitrary, one of the cavity field distributions may be multiplied by −1 in order to change the sign of two ECCs—the two associated with the two couplings to that cavity. Hence, the sign of each ECC is not unique. However, the LCP is not changed and is an invariant property of the structure with respect to the arbitrary choice of spatiotemporal reference phase for each cavity mode. When ECCs $\mu_{i,j}$ are substantially wavelength-independent near resonance, as in the case of evanescent coupling, then the LCP is also not a function of wavelength. Therefore, positive and negative coupling coefficients may be referred to, but it should be understood that these are not unique definitions, and the LCP (set) defines the structure properties uniquely, to within an additional port-to-port transmission phase. It turns out that positive, negative, and arbitrary-phase LCCs enable different response functions to be achieved, as described further below. Therefore, it is important to design physical structures that are capable of realizing "positive," "negative," and arbitrary-phase coupling coefficients, such that their product, the LCC, may also be such, i.e., positive, negative, or arbitrary-phase complex.

The Applicant has observed that it is possible to achieve negative coupling in optical resonators by using high-order resonant modes, i.e., modes with at least one null in the electric field pattern. Then, the positive and negative lobe of the same resonant mode may be coupled to various other modes, and a negative LCC may also be generated, as done in FIG. 5a. While in microwave engineering typically low-order resonant modes are used due to size, weight, and loss Q constraints with metallic cavities, in optical resonators using high-order cavity modes is not a disadvantage since optical resonators often operate at high-order to achieve high Q (e.g., microring resonators). This is because dielectric optical resonators are confined by refractive index discontinuity, and radiation Q can be increased by increasing cavity size and mode order.

High-order (i.e., second-order) field pattern resonances are used in FIG. 5a to produce a negative LCC. In FIG. 5b, it is shown that a geometrical rearrangement of the resonant mode coupling configuration permits positive LCC in the same structure, by forming two negative couplings ($\mu_{54,52}$ and $\mu_{52,56}$) and one positive coupling ($\mu_{56,54}$). The strengths (magnitudes) of all coupling coefficients may remain the same in the two configurations. When external access ports are coupled to the resonant system, the phase of the LCC (i.e., the LCP) has unique consequences for the response. With an appropriate choice of coupling coefficients, a third-order bandpass filter may be formed with a single transmission zero in the drop port response. Then, the cases of positive and negative LCC have the transmission zero on opposite sides of the passband when all coupling magnitudes are kept fixed, but the LCP is changed by 180°.

Electromagnetic reciprocity restricts the LCPs that may be obtained in a resonant system. Structures formed of reciprocal media, if also lossless, have a uniform phase across the cavity field pattern, which can thus be (for standing-wave-cavity modes) assumed a real number distribution with a particular choice of reference phase. Hence, only positive or negative coupling coefficients, and thus only a positive or negative LCC, or 0 or 180° LCP, may be produced. An exception is degenerate resonators, which are addressed below.

Non-reciprocal resonators, which include magneto-optic media, as well as reciprocal traveling-wave resonators, permit arbitrary-phase coupling and thus permit an arbitrary LCP. Non-reciprocal lossless structures do not have the restriction of uniform phase across the resonant mode field. Reciprocal traveling-wave (including microring) resonators behave the same way because they have two degenerate resonances. Either two degenerate, orthogonal standing-wave modes (excited 90° out of phase to simulate a traveling-wave resonance), or two (a clockwise and anti-clockwise) propagating traveling-wave modes may be chosen as a basis. When the latter point of view is chosen, arbitrary LCPs may be obtained. Whether LCPs can be arbitrary depends on the choice of basis because the LCC depends on the ECCs, which in turn are defined with respect to the resonant modes; so, the choice of basis of resonant modes is ultimately that with respect to which the LCP has a meaning. This is explained in greater detail below.

Figure 6A:
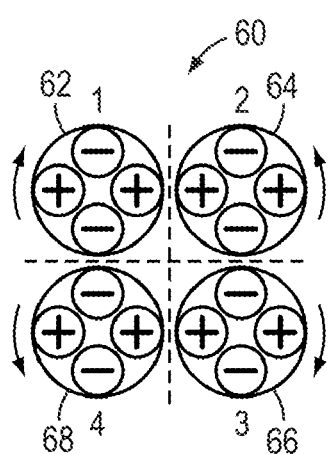
FIG. 6a illustrates a set of four traveling-wave circular disk resonators, with positive LCC, in accordance with an embodiment of the invention.
Figure 6B:
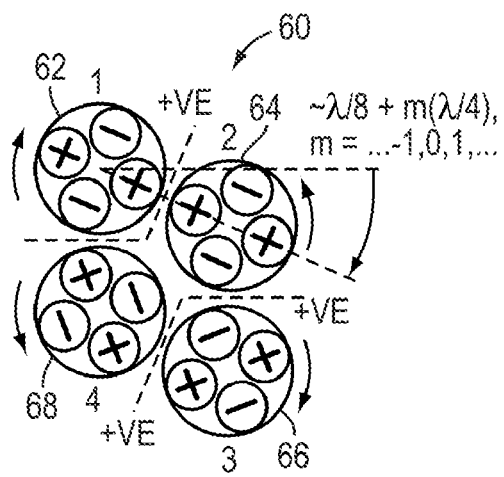
FIG. 6b illustrates a set of four traveling-wave circular disk resonators, with negative LCC, in accordance with an embodiment of the invention.

FIGS. 6a and 6b each show a set 60 of four traveling-wave circular disk resonators 62, 64, 66, 68 (which may, alternatively, be ring resonators), each having an excited resonance that has two wavelengths round-trip. FIG. 6a depicts a positive LCC, while FIG. 6b depicts a negative LCC. In order to maintain unidirectional resonance excitation (i.e., excite 1 mode per cavity), coupling loops using an even number of cavities are, in one embodiment, formed, because the sense (angular direction) of propagation changes from cavity to cavity. One way to see how the loop coupling coefficient is formed is to look at one of the two sets of standing wave modes that are excited 90° out-of-phase to simulate the traveling-wave resonance. One set of standing-wave modes (modes of the individual, uncoupled cavities considered), chosen so as to be orthogonal and not couple to the second set, is shown in FIG. 6a. By observing the overlap integrals, all four positive by inspection, it may be ascertained that FIG. 6a, with a square-grid arrangement of ring or disk resonators 62, 64, 66, 68, provides a positive LCC, i.e., 0° LCP. FIG. 6b shows a snapshot of the same system of four cavities 62, 64, 66, 68, with modes oriented to obtain three positive coupling coefficients ($\mu_{64,62}$, $\mu_{66,64}$, and $\mu_{68,66}$) and one negative coupling coefficient ($\mu_{62,68}$), resulting in a negative LCC, i.e., 180° LCP. To obtain a negative LCC, the square-grid ring resonator arrangement may be tilted by $\frac{1}{8}^{th}$ of the guided wavelength in the resonator. In this case, since each resonator 62, 64, 66, 68 has 2 wavelengths per round-trip, one wavelength covers a 180° angle of motion around the cavity and the tilt is thus 180°/8=22.5°. This assumes that all four coupling coefficients are equal, i.e., that the coupling gaps are all the same. In general, the coupling coefficients and coupling gaps may all be different, and the geometrical tilt may be different from $\frac{1}{8}^{th}$ wavelength.

A second way to obtain the value of the LCP is to begin at any resonator 62, 64, 66, 68 and follow the propagation path of a traveling wave excited in the resonator 62, 64, 66, 68, traversing all four resonators 62, 64, 66, 68 (in any way that makes a full traversal), and returning to the starting point after a full round trip. In such a case, the LCP is the total propagation phase accumulated in the traversal, assuming for each cavity its propagation constant at its uncoupled resonance frequency, and not applying any additional phase at points where crossing from one cavity to the next via a directional coupler.

FIGS. 6a and 6b also set forth a physically helpful naming of the positive and negative couplings. If mode fields are unipolar (no nodes) and taken by convention as positive, a positive coupling results from a positive (electric) polarizability of the coupling perturbation. Since the positive coupling perturbation stores electric energy, it may also be referred to as capacitive coupling. Negative coupling, likewise, results from a negative (magnetic) polarizability of the perturbation, and may also be referred to as inductive coupling. The ⅛ wavelength tilt in the traveling wave resonators in a 4-cavity loop, or the use of a standing-wave mode with a field null, to get negative coupling suggests a physical interpretation of the geometrical as an impedance transformation applied to one positive coupling coefficient. A negative (inductive) coupling may be thought of as a positive (capacitive) coupling with a quarter-wave impedance transformer on each end, which is equivalent to a sign flip (180° phase change) in the field of one of the modes.

Finally, since tilting the geometry of coupled microring (or other traveling-wave) cavities may change the LCC from positive to negative, tilts other than $\frac{1}{8}^{th}$ of a guided wavelength may result in arbitrary-phase LCC and thus arbitrary LCP. This is possible in rings, while it typically is not possible in reciprocal standing-wave cavities. For arbitrary LCPs in general, one set of orthogonal standing wave modes in the rings depicted in FIG. 6a and the second, complementary set of orthogonal modes are not independent, but are rather coupled to each other when placed in a loop. Therefore, arbitrary LCP may be simulated with two sets of standing-wave cavities appropriately coupled.

Now, several exemplary loop-coupled structures with various LCP configurations are shown and their properties described.

Figure 7:
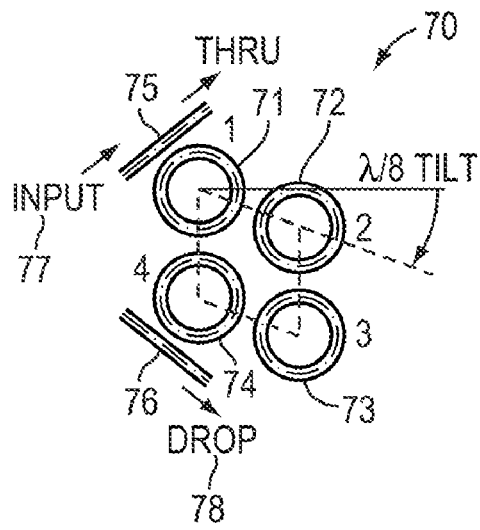
FIG. 7 illustrates a loop-coupled traveling-wave structure having a negative LCC in accordance with an embodiment of the invention.
Figure 8:
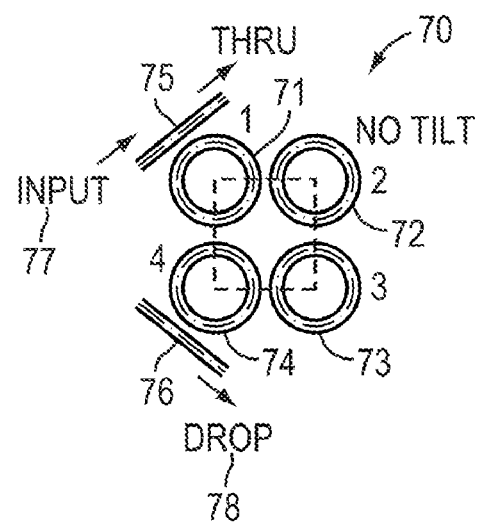
FIG. 8 illustrates a loop-coupled traveling-wave structure having a positive LCC in accordance with an embodiment of the invention.

FIG. 7 shows a $4^{th}$-order channel add-drop filter design 70 having an input waveguide 75, an output waveguide 76, and a system of four coupled microring resonators 71-74 of substantially equal radius. In the embodiment shown, the system of four coupled microring resonators 71-74 forms a single coupling loop, which has a geometrical tilt of about $\frac{1}{8}^{th}$ of the microring guided wavelength to provide a negative LCC, i.e., 180° LCP. The ring radii need not, however, be similar. In particular, the first cavity 71 is coupled to the input waveguide 75 and to the second cavity 72. The second cavity 72 is in turn coupled to the third cavity 73, which is in turn coupled to the fourth and final cavity 74. The fourth cavity 74 is also coupled to the output waveguide 76 and to the first cavity 71. FIG. 8 shows the same structure 70 in a square-grid configuration, but without a geometrical tilt, and thus the structure 70 has a positive LCC, i.e., 0° LCP. In the embodiments shown in FIGS. 7 and 8, an even number of microring resonators 71-74 (i.e., four) form the coupling loop so that light will only propagate in a single direction in each of the resonators 71-74, when an optical input signal is sent into only one of the input ports. While only microring resonators 71-74 are shown in the embodiments depicted in FIGS. 7 and 8, the structure 70 (and any structure described herein as employing microring resonators) may more generally include any type of ring-type resonator 71-74, such as a racetrack resonator. Most generally, we consider a ring-type resonator as any structure consisting of a length of waveguide whose beginning and end are joined so as to form a closed loop path for propagating light; which we also refer to as a traveling-wave resonator.

Figure 1:
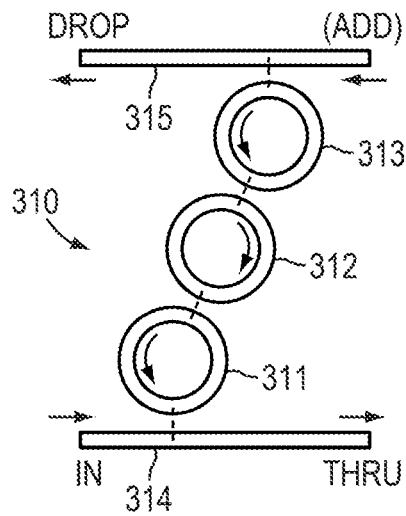
FIG. 1 illustrates one embodiment of a series-coupled-cavity structure known in the art.
Figure 2:
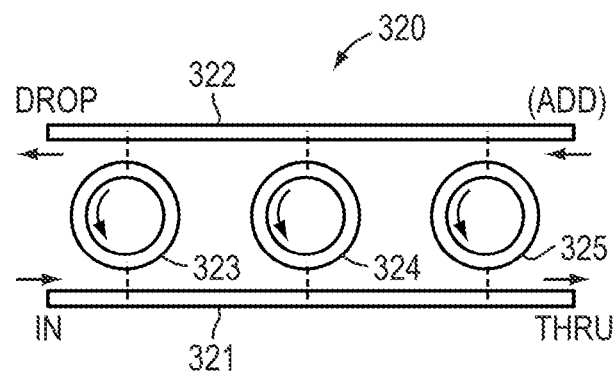
FIG. 2 illustrates one embodiment of a parallel-coupled-cavity filter known in the art.

In one embodiment, the structures 70 in FIGS. 7 and 8 have a non-all-pole (i.e., a pole-zero) spectral response from the input port 77 to drop port 78 that may not be obtained in SCC structures, such as the SCC structure 310 of FIG. 1. Thus, with the structures 70 in FIGS. 7 and 8 supporting pole-zero input-to-drop responses, by engineering the positions of transmission nulls, quasi-elliptic filter responses may be realized. The structures 70 in FIGS. 7 and 8 have 4 system poles (resonances) due to the four resonant cavities 71-74 (specifically each pole corresponding to one of the four supermodes of the coupled system of the four resonant cavities, with ports), but introduce only two finite-frequency zeros. The existence of two transmission zeros can be understood by thinking of the filter 70, in the case of off-resonant excitation, as a Mach-Zehnder (MZ) interferometer formed of resonators. The MZ has two feed-forward paths from the input port 77 to drop port 78, which interfere, the first being (input port 77)-(cavity 71)-(cavity 74)-(drop port 78), and the second being (input port 77)-(cavity 71)-(cavity 72)-(cavity 73)-(cavity 74)-(drop port 78). In general, an excited cavity couples energy in all directions (i.e. out to all adjacent cavities coupled to it, regardless from which direction a signal is coming), so a feed-forward (interferometer-like) model cannot be assumed for the flow of energy. However, in the off-resonant regime, the energy coupled from one cavity to the next in the forward direction (e.g., cavity 71 to 72) is small, and that returning in the backward direction (e.g., cavity 72 to 71) is the square of this small coupling—i.e., it is even smaller. Thus an MZ feed-forward interferometer of cavities is a reasonable asymptotic model far off-resonance, but turns out to hold valid with reasonable accuracy even just outside the resonant passband (i.e. fairly near resonance). Zeros are of importance for passband engineering in particular when placed outside the passband at real or complex frequency detunings, so this model is relevant.

Then, in this embodiment, the number of transmission zeros introduced into the input 77-to-drop-port 78 spectral response is equal to the number of cavities bypassed by the shortest path from input to output. Since cavities 72 and 73 are bypassed by the coupling from cavity 71 to cavity 74, the filters 70 depicted in FIGS. 7 and 8 have 2 transmission zeros in the drop response, and the filter rolloff is $4^{th}$-order (approximately 80 dB/decade of frequency detuning) near the passband as illustrated by the long-dash line 104 in FIG. 10, but reduces to $2^{nd}$-order (approximately 40 dB/decade) at detunings from center wavelength larger than those of the transmission zeros, as illustrated by the dotted line 103 in FIG. 10. This is because far from resonance only a collection of 4 poles and 2 zeros near a common center wavelength are seen, and hence there is apparent cancellation of 2 poles by 2 zeros, leaving 2 poles to effect the remaining rolloff of the passband.

Figure 9:
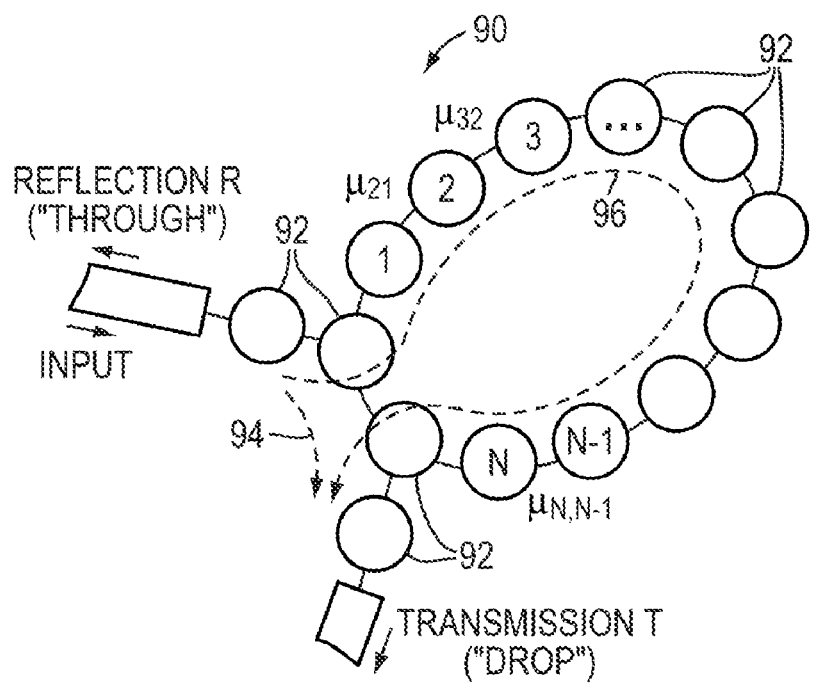
FIG. 9 illustrates a MZ model of a loop coupling in accordance with an embodiment of the invention.

FIG. 9 shows a structure that illustrates a general MZ model 90 of a loop coupling (and is itself a valid loop-coupled structure) with N+4 cavities 92, where N of the cavities along an energy propagation path 96 are bypassed by a second interferometric path 94, thus creating N transmission zeros.

Figure 10A:
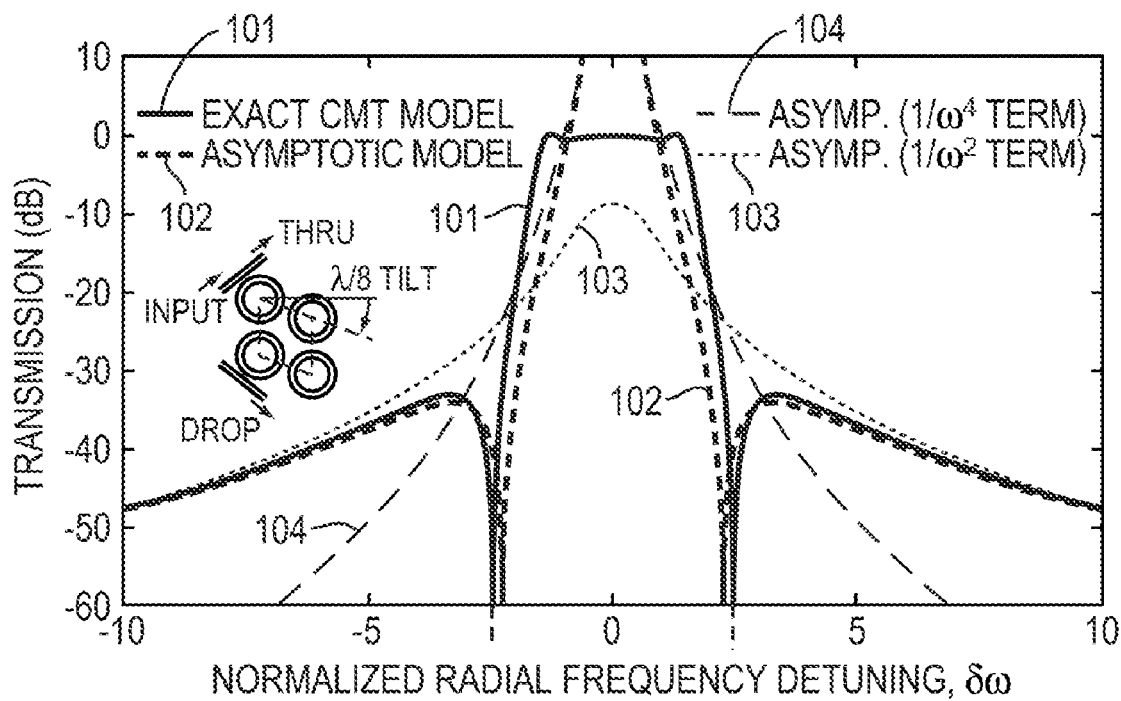
FIG. 10a is a graph that illustrates a frequency-normalized performance of a particular design (choice of energy coupling coefficients) of the device of FIG. 7 in accordance with an embodiment of the invention.

FIG. 10a shows the actual response (input port 77-to-drop port 78), including the effect of transmission zeros, of the device 70 shown in FIG. 7. More specifically, FIG. 10a shows a frequency-normalized performance of the device 70 of FIG. 7, having an approximately $\frac{1}{8}^{th}$ wavelength tilt. The horizontal axis shows normalized frequency units in rad/s. An approximately flat-top response with two real-frequency zeros on the sides of the passband that help to increase the sharpness of the passband is illustrated. Such a sharper passband means that wavelength-division-multiplexed (WDM) channels may be more densely packed into the available optical spectrum, while being able to maintain a similar out-of-band rejection ratio, number of resonators, and input-to-drop loss. The filter 70 whose performance is illustrated in FIG. 10a by line 101 uses ECCs: $\{2/\tau_{in}, \mu_{71,72}, \mu_{72,73}, \mu_{73,74}, 2/\tau_{out}, \mu_{74,71}\} = \{2.2, 1, 1, 1, 2.2, -0.2\}$ rad/s. The negative sign in the last coupling indicates a negative product of ECCs, i.e., a negative LCC.

With regard to coupling coefficients used to describe the devices of the present invention, two descriptions are used: energy coupling coefficients (ECCs), and power coupling coefficients (PCCs). Each may be converted to the other. ECCs are representative of a general concept, whose definition is well known in the framework of coupled mode theory in time, used to describe the coupling: (a) between a first and a second resonant cavity, or (b) between a resonant cavity and a waveguide or optical access port. Coupling between a resonant cavity mode and a waveguide or port is described by an energy-amplitude decay rate, $r_n \equiv 1/\tau_n$, of the energy amplitude of the resonant mode into the waveguide or port, where n is used to index an arbitrary coupling coefficient, $r_n$ is the decay rate, and $\tau_n$ is the decay time. The energy is the square of the magnitude of the energy amplitude, so the energy decays with energy decay rate $2/\tau_n$, with units equivalent to rad/s. On the other hand, coupling between a first and a second resonant cavity mode is described by the rate at which energy passes back and forth between the coupled cavities, measured as a frequency in rad/s and indicated by a complex-number labeled $\mu_{i,j}$, referred to elsewhere as the ECC $\mu_{i,j}$, whose magnitude is the coupling frequency and whose phase indicates the location of coupling with respect to a reference point chosen for the resonant mode. The phase of the complex-number ECC $\mu_{i,j}$ plays a role in the LCP. For all structures described herein, all cavity-waveguide ECCs are specified as energy decay rates $2/\tau_n$ and all cavity-cavity ECCs are specified as coupling rates $\mu_{i,j}$, both in consistent rad/s units unless stated otherwise. Moreover, all ECCs are typically collected and given as a set. For example, for a four-cavity SCC structure, the ECCs are listed from input to output: $\{2/\tau_{in}, \mu_{12}, \mu_{23}, \mu_{34}, 2/\tau_{out}\}$. For more complex (e.g., loop-coupled) structures, the sequence in which coefficients are listed is explicitly stated. Furthermore, a set of "normalized ECCs" may be stated, which hold for a "prototype filter" whose passband cutoff frequency is 1 rad/s from the center frequency (i.e., full passband width of 2 rad/s), as is common practice in electrical circuit design. The actual ECCs may be obtained by unnormalizing, i.e., by multiplying the normalized ECCs by the desired actual half-bandwidth of the filter, in rad/s.

When using traveling-wave cavities, including microring and racetrack resonators, the cavity-cavity and cavity-waveguide coupling are typically achieved by evanescent coupling across directional coupler regions. Directional couplers are described by a PCC, which determines the fraction of power incident into the input port of one waveguide that is coupled to the cross-port, i.e., to the output port in the other waveguide. In this case, the ECCs of a resonant structure can be translated to PCCs corresponding to the directional couplers in the structure. The conversion is done in two steps: ECC to PCC conversion, and PCC correction for finite FSR. We note, as known in the literature, that for purposes of the coupling coefficient formulas the FSR is defined not as the actual frequency spacing between two adjacent resonant orders, but rather as $FSR \equiv v_{group}/L_{roundtrip}$, where the group velocity, $v_{group}$, is evaluated at the resonance frequency of interest and $L_{roundtrip}$ is the round-trip length of the resonant cavity. If the group velocity is given in meters per second and the round-trip cavity length in meters, then the FSR is given in cycles per second (Hertz). In the first step of the conversion, for cavity-waveguide coupling, the PCC $\kappa_n^2$ (where $\kappa_n$ is amplitude coupling), is given by $$\kappa_n^2 FSR_m = 2/\tau_n, \qquad (9)$$

where $FSR_m$ is the FSR of the particular cavity in question, in units of Hz (cycles/second) if the energy decay rate $2/\tau_n$ is given in rad/s. For cavity-cavity coupling, the power coupling between resonant mode i of a first cavity and resonant mode j of a second cavity is given by $$\kappa_{i,j}^2 FSR_1 FSR_2 = |\mu_{i,j}|^2, \qquad (2)$$

where $FSR_1$ and $FSR_2$ are the FSRs of the respective modes of the first and second cavity, in Hz, if $\mu_{i,j}$ is in rad/s. Note that the second cavity may, for certain couplings, be the same cavity as the first cavity, in which case the associated ECC $\mu_{i,j}$ describes coupling of two resonant modes in one cavity. Furthermore, for j=i, $\mu_{i,i}$ represents coupling of a mode to itself due to a perturbation. This nomenclature for coupling coefficients and decay rate variables, and the associated relationships, are well described in literature.

Once the PCCs are obtained from the ECCs, a second mapping, also known in the art, is applied to account for the finite FSR of the cavities. Each PCC is replaced by a scaled version of itself as:

$$\kappa^2 \leftarrow \frac{\kappa^2}{\left(1 + \frac{\kappa^2}{4}\right)^2} \qquad (3)$$

In the obtained PCC set, all numbers are unitless power coupling fractions, one per directional coupler.

Referring again to FIG. 10a, which illustrates the physical implications of loop coupling on the transmission zeros and spectral response, the asymptotic Mach-Zehnder model described previously using the structure 90 depicted in FIG. 9, and where the model treats the device 70 depicted in FIG. 7 as a two-path feed-forward interferometer and is valid off-resonance, is also shown by medium-dashed line 102. The good agreement between the asymptotic model line 102 and the exact response line 101 outside the passband, and even for the locations of the transmission zeros that are placed quite near the passband, validates the use of this physical model to understand the physical operation of loop-coupled resonant devices. Two asymptotes on FIG. 10a (lines 103 and 104) show that far from resonance the filter rolloff is second-order (line 103), while near the passband it is sharper, closer to fourth-order rolloff (line 104).

Figure 10B:
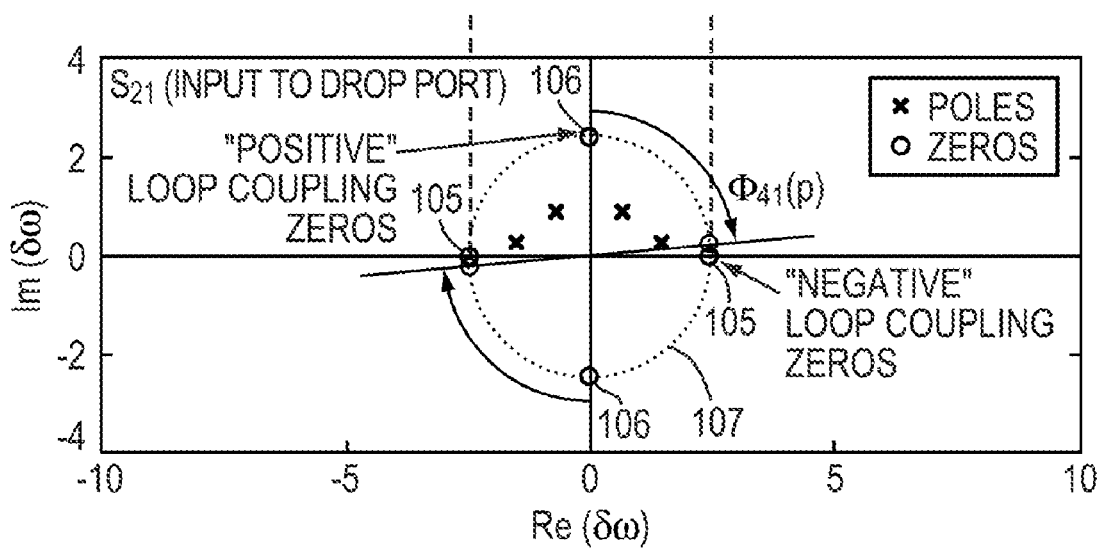
FIG. 10b illustrates the location in the complex-frequency plane of the transmission zeros for several exemplary LCPs.

FIG. 10b shows the location in the complex-frequency plane (with origin placed at the center of the passband, thus showing complex frequency detuning) of the transmission zeros for several exemplary LCPs. For the structure 70 depicted in FIG. 7, with 180° LCP, the zeros 105 are located diametrically on opposite sides of the center wavelength, on the real-frequency axis (i.e., the horizontal axis). The detuning distance of the zeros 105 from the passband center is inversely proportional to the magnitude of the coupling coefficient between cavities 71 and 74, $\mu_{74,71}$ and directly proportional to the other three cavity-cavity couplings, $\mu_{72,71}$, $\mu_{73,72}$ and $\mu_{74,73}$. When $\mu_{74,71}=0$, the zeros 105 go to arbitrarily large detuning and the filter 70 reverts to a standard SCC all-pole design. For the structure 70 depicted in FIG. 8, when the LCP=0, the zeros 106 are located at imaginary frequency detunings, again on diametrically opposite sides of the passband center. By varying the LCP, for example by tilting the structure 70 of FIG. 8 toward that of FIG. 7, the pair of zeros 106 may be rotated to any location on the locus circle 107 shown in FIG. 10b, where the radius is determined approximately (from the asymptotic MZ model derived using the structure 90 in FIG. 9) by the product of the couplings along the long cavity-interferometer path 96 divided by the coupling along the short path 94. The square root of this quotient of couplings is the detuning from center frequency, and the phase of the detuning is related directly to the direction in the complex frequency plane along which the zeros are placed—which can be shown to depend only on the LCP, $\Phi$, as indicated by equation (4), below:

$$\delta\omega \approx \pm \sqrt{\frac{\mu_{74,73}\mu_{73,72}\mu_{72,71}}{\mu_{74,71}}} e^{-j(\Phi+\pi)/2} \qquad (4)$$

Note that equation (4) holds only for 4-cavity coupling loops, such as those shown in FIGS. 7 and 8, with a waveguide attached to each of two adjacent cavities; however, similar expressions may be derived for any order coupling loops.

It is of interest to create filters with a full N poles and N zeros (per FSR) with controllable frequency positions, for an N-cavity system, because the sharpest achievable spectral response for bandpass filters is known to be the elliptic function response, which requires N poles and N zeros. Realizing this response function is optimal in the sense of achieving the sharpest filter rolloff with a given number of cavities, i.e., a given order of the resonant system. The previous discussion makes clear that a filter with an equal number of poles and zeros (e.g., four) will have no rolloff at large enough detuning, because all the poles and zeros cancel when observing the passband wavelength from the vantage point of a large wavelength detuning. This is consistent with the spectral shape of an elliptic filter response function, which reaches a constant level at large detuning.

Figure 3:
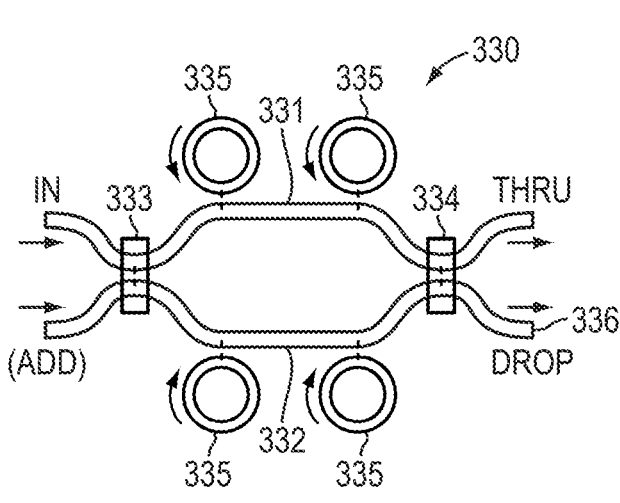
FIG. 3 illustrates one embodiment of a Mach-Zehnder all-pass decomposition resonant structure known in the art.
Figure 4:
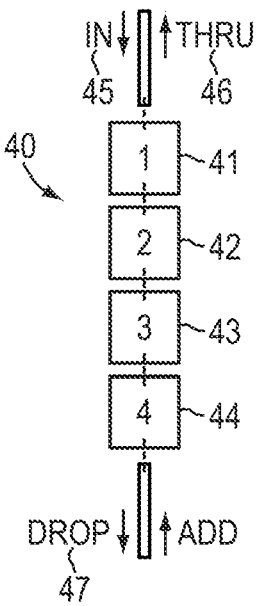
FIG. 4 illustrates one embodiment of a series-coupled-cavity structure, known in the art, that is based on standing-wave resonators.
Figure 11:
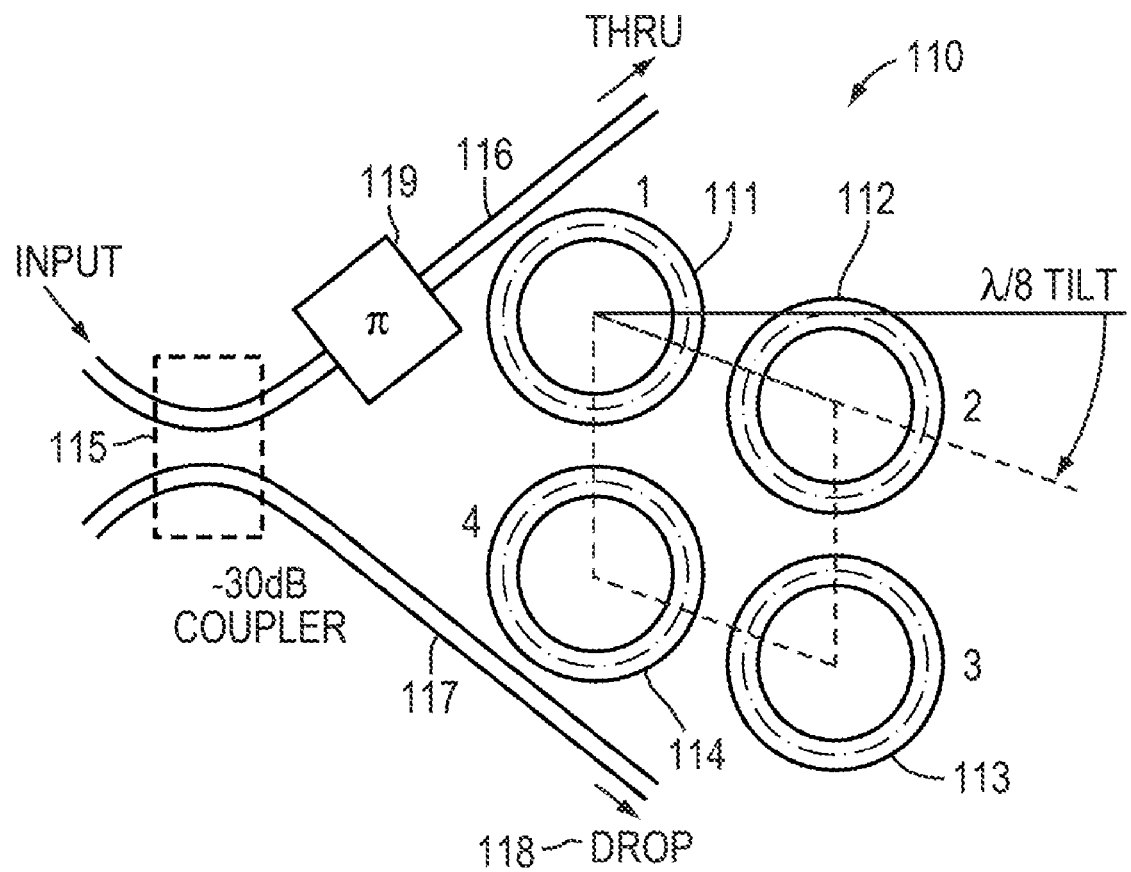
FIG. 11 illustrates a loop-coupled traveling-wave structure in accordance with an embodiment of the invention.

Referring now to FIG. 11, one way to obtain a wavelength-independent transmission at a given rejection level is to introduce a direct, weak coupling 115 between an input waveguide 116 and an output (drop-port) waveguide 117, in front of or behind the position at which the system of coupled cavities 111-114 is placed between the two waveguides 116, 117. A very weak directional coupler 115 with 0.001 power coupling fraction (−30 dB) may be used for an elliptic filter demanding a 30 dB out-of-band rejection in the drop port 118. In one embodiment, the length of the input waveguide 116 between the directional coupler 115 and the point at which the microring resonator 111 couples to the input waveguide 116 is substantially equal to the length of the output waveguide 117 between the directional coupler 115 and the point at which the microring resonator 114 couples to the output waveguide 117. In another embodiment, a phase shift 119 (here of 180°) is introduced in the input waveguide 116 between the coupler 115 and the filter (represented by cavities 111-114) in order to produce real-frequency zeros outside the passband in the drop port 118 spectrum (as illustrated by the solid-curve 123 spectrum in FIG. 12). Hence, the (typically weak) coupling of the input waveguide 116 and the transmission (drop-port) waveguide 117 of interest is an alternative and additional way of creating controllable transmission zeros. It should be noted that this addition does not harm the robustness (e.g., to fabrication variations) of the design because the coupling is very weak, and any error in the coupling coefficient in the directional coupler 115 only slightly changes the rejection level. By contrast, all-pass decomposition (AD) filters, such as structure 330 illustrated in FIG. 3, that rely on 3 dB couplers are highly sensitive to small errors in the 3 dB splitting ratio, which may lead to poor rejection levels over part or all of the operating wavelength range when either fabrication errors are introduced, or an insufficiently wavelength-independent coupler is designed.

In one embodiment, the optical coupling between the input waveguide 116 and the output waveguide 117 introduced by the directional coupler 115 is substantially broadband over several passband widths, for example over at least three passband widths or over at least ten passband widths. It should also be noted that the phase shift 119 may be introduced in the output waveguide 117, as opposed to in the input waveguide 116, between the directional coupler 115 and the four cavities 111-114. Moreover, although the structure 110 is shown in FIG. 11 to include four microring resonators 111-114 coupling the input waveguide 116 to the output waveguide 117, more generally any number of resonators may be employed, including a single resonator, or a plurality resonators that are loop-coupled or that are not loop-coupled. As shown in FIG. 11, the four microring resonators 111-114 may form a coupling loop, as described above for the structure 70 of FIG. 7.

Figure 12:
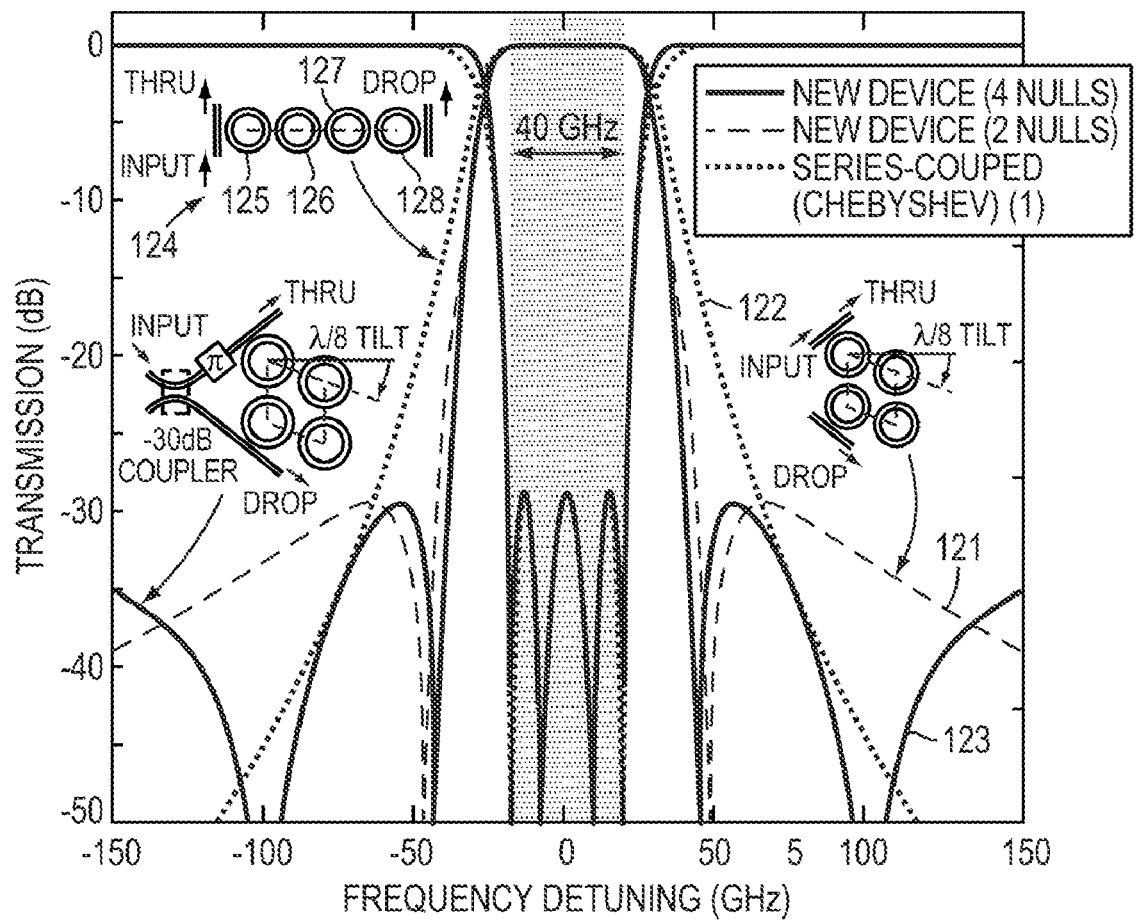
FIG. 12 is a graph that compares three exemplary $4^{th}$-order filter designs of different geometries.

The structures 70 and 110 in FIGS. 7 and 11, respectively, may be used in flat-top channel add-drop filters having higher selectivity than SCC all-pole designs. A comparison of exemplary $4^{th}$-order filter designs using the three geometries (i.e., structure 70 depicted in FIG. 7, structure 110 depicted in FIG. 11, and a $4^{th}$-order SCC all-pole design similar to the $3^{rd}$-order structure 310 in FIG. 1) is shown in FIG. 12. In one embodiment, all three filters are designed to have a 30 dB in-band extinction in the input-to-through-port response across about a 40 GHz passband so that their out-of-band rolloff in the drop port may be compared. The presence of two zeros in the loop-coupled design 70 of FIG. 7 makes its response (dashed line 121 in FIG. 12) much sharper than that of the standard SCC structure with a plain Chebyshev response (dotted line 122 in FIG. 12). Using the structure 110 of FIG. 11, with about −30 dB direct coupling of the input and output waveguides 116, 117 introducing another 2 real-frequency transmission zeros, gives the sharpest, elliptic-function-shaped response (solid line 123 in FIG. 12). In practice, for an $N^{th}$ order structure, it may be preferable to design for N-1, N-2, or fewer zeros so that the drop-port response rolls off at a rate of at least first or second order at large detuning.

The design parameters of the filter designs shown in FIG. 12 may, in various embodiments, be as follows. For the standard SCC design 124 (shown in the top left-hand corner of FIG. 12) having cavities 125, 126, 127, 128, a Chebyshev filter may be designed with normalized ECCs: $\{2/\tau_{in}, \mu_{125,126}, \mu_{126,127}, \mu_{127,128}, 2/\tau_{out}, \mu_{128,125}\} = \{3.078, 1.154, 0.8349, 1.154, 3.078, 0\}$ rad/s. For the shown 40 GHz-bandwidth filters of the standard SCC design 124, the corresponding actual ECCs may be $\{386.8, 145, 104.9, 145, 386.8, 0\}$ Grad/s (where Grad=gigaradian=$10^9$ radians). For a microring-resonator implementation of the standard SCC design 124, using, in one embodiment, microrings with a 3 THz FSR that is typically achievable in high-index-contrast microring resonators, the corresponding PCCs may be $\{\kappa_{in}^2, \kappa_{125,126}^2, \kappa_{126,127}^2, \kappa_{127,128}^2, \kappa_{out}^2, \kappa_{128,125}^2\} = \{0.121, 0.002335, 0.001222, 0.002335, 0.121, 0\}$. As before, the coupling coefficients subscripted with pairs of numbers label and indicate cavity-cavity coupling, while 'in' and 'out' indicate coupling to the input and output waveguides of the standard SCC design 124.

For the loop-coupled structure 70 of FIG. 7, which may provide a quasi-elliptic response, the normalized ECCs may be: $\{2/\tau_{in}, \mu_{71,72}, \mu_{72,73}, \mu_{73,74}, 2/\tau_{out}, \mu_{74,71}\} = \{3.018, 1.098, 0.9036, 1.098, 3.018, -0.2287\}$ rad/s. For the shown 40 GHz-bandwidth filters of the loop-coupled structure 70, the corresponding actual ECCs may be $\{379.3, 137.9, 113.6, 137.9, 379.3, -28.73\}$ Grad/s. The product of the four cavity-cavity couplings is negative, indicating a LCP of 180° in the loop-coupled structure 70, which leads to the two real-frequency-axis zeros. For a microring implementation of the loop-coupled structure 70 with a 3 THz FSR, the corresponding PCCs may be $\{\kappa_{in}^2, \kappa_{71,72}^2, \kappa_{72,73}^2, \kappa_{73,74}^2, \kappa_{out}^2, \kappa_{74,71}^2\} = \{0.1188, 0.002111, 0.001432, 0.002111, 0.1188, 0.0000917\}$.

For the loop-coupled structure 110 of FIG. 11 with direct coupling between the input and output waveguides 116, 117, which may provide an elliptic response with 4 nulls, the normalized ECCs may be: $\{2/\tau_{in}, \mu_{111,112}, \mu_{112,113}, \mu_{113,114}, 2/\tau_{out}, \mu_{114,111}\} = \{2.96, 1.076, 0.919, 1.076, 2.96, -0.3274\}$ rad/s. For the shown 40 GHz-bandwidth filters of the loop-coupled structure 110, the corresponding actual ECCs may be $\{372, 135.3, 115.5, 135.3, 372, -41.14\}$ Grad/s. The product of the four cavity-cavity couplings is negative, indicating a LCP of 180° in the loop-coupled structure 110, which contributes to two of the four real-frequency-axis zeros. In one embodiment, the input and output waveguides 116, 117 are coupled in a directional coupler 115, with 0.00118 power coupling, located before the cavities 111-114. In addition, the optical paths from the symmetric directional coupler 115 to cavities 111 and 114, respectively, may be made to differ by 180° by the introduction of a phase shift 119 to paths of otherwise identical lengths, each being in one of the waveguides 116, 117. This may be done by adding a half-guided-wavelength of extra length of waveguide in one of the two arms 116, 117, at the filter center wavelength, or by using a thermooptic phase shifter, or by other means. For a microring implementation of the loop-coupled structure with a 3 THz FSR, the corresponding PCCs may be $\{\kappa_{in}^2, \kappa_{111,112}^2, \kappa_{112,113}^2, \kappa_{113,114}^2, \kappa_{out}^2, \kappa_{114,111}^2\} = \{0.1167, 0.002031, 0.001481, 0.002031, 0.1167, 0.0001881\}$.

The described $4^{th}$-order structures with a single coupling loop may be realized in microring resonator technology in a single lithographic layer. By using multiple loop couplings, the control of multiple zeros of transmission may be obtained, and high-performance filters and optical delay lines that are non-minimum-phase and thus are not constrained in amplitude and phase response by the Kramers-Kronig condition may be designed.

Figure 13A:
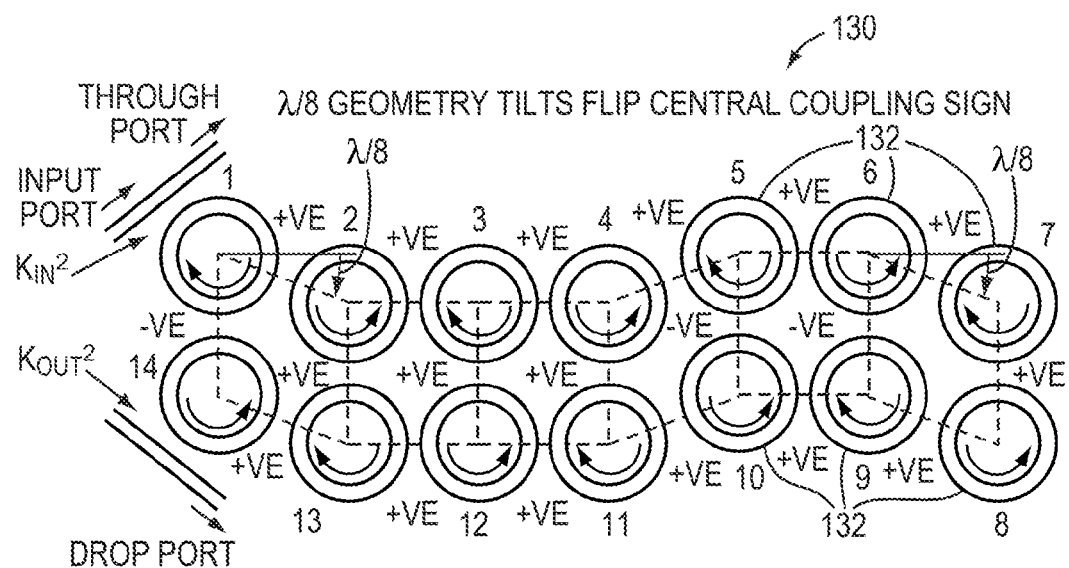
FIG. 13a illustrates a $14^{th}$-order structure in microring-resonator technology in accordance with an embodiment of the invention.
Figure 13B:
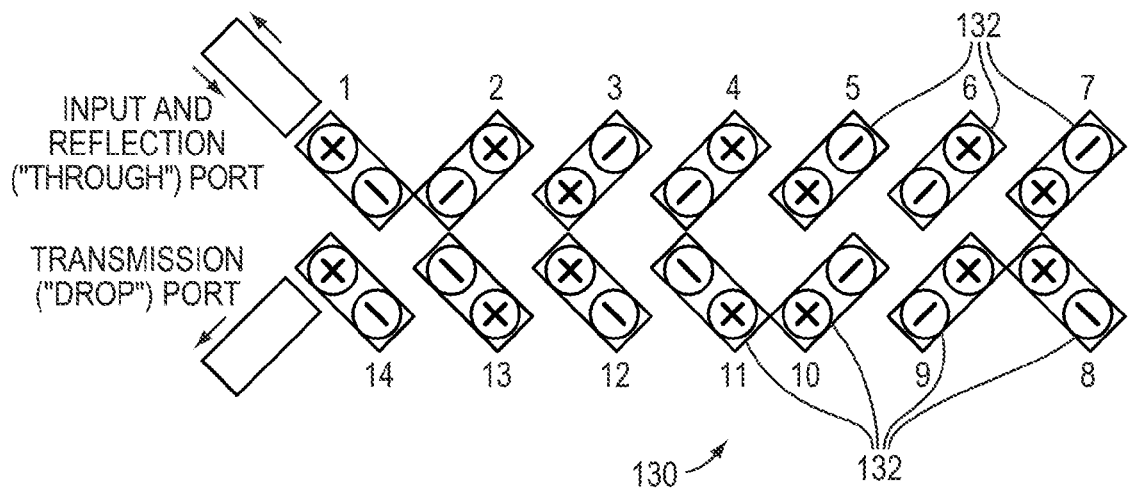
FIG. 13b illustrates a functionally equivalent structure to the structure of FIG. 13a, using standing-wave optical cavities, in accordance with an embodiment of the invention.

FIGS. 13a and 13b each illustrate one embodiment of another structure according to the present invention. The structure 130 includes two rows of coupled resonators 132, with equal number of resonators 132 in each row and with each resonator 132 coupled both horizontally and vertically. In one embodiment, the inter-row (i.e., vertical) couplings (for example, the inter-row energy coupling coefficients) are weaker than the intra-row (i.e., horizontal) couplings. More specifically, FIG. 13a shows a realization of an exemplary 14$^{th}$-order structure 130 in microring-resonator technology, while FIG. 13b shows a schematic of an exemplary, functionally equivalent structure 130 realized using standing-wave cavities 132 (e.g., photonic crystal microcavities), each cavity 132 having a two-lobe resonant mode. In FIG. 13b it is understood that horizontally and vertically adjacent cavities 132 may be substantially coupled in the schematic, but not those diagonally adjacent. In one embodiment, the structures 130 use positive and negative LCCs. The structures 130 have six independent coupling loops (others are redundant), which determine the spectral features (an additional direct phase from input to output only sets the overall phase, which has no consequence for the spectral shape).

The structures 130 illustrated in FIGS. 13a and 13b are capable of realizing non-minimum-phase responses, in particular filter responses having a flat-top passband and linear phase simultaneously, and without the need for additional all-pass dispersion compensators following the structure, as is necessary to linearize the phase of SCC structures. The structure 130 is optimal in the sense that it supports the most selective (quasi-elliptic) amplitude responses for a given resonance order. In the structure 330 of FIG. 3, an architecture known in the art to allow elliptic optical filters, the extinction ratio is sensitive to obtaining a balanced, broadband 3 dB splitter. By contrast, the structures 130 of FIGS. 13a and 13b are very robust, and at once provide highly compact implementations of these optimal filter responses. Having distributed dispersion compensation within the structure 130 has advantages not only for filters, but also for nonlinear applications where distributed dispersion management is preferable.

The structure 130 may directly implement an "equidistant linear-phase polynomial" response function that is known in the art. This response function may simultaneously provide optimally flattened amplitude and group-delay responses (i.e., linearized phase). This is generally done with fewer resonators (e.g., the minimum) than required in an equivalent cascade of an all-pole filter (e.g., an SCC) followed by an all-pass dispersion compensator. A second use of the device 130 may be for slow-light optical delay lines. Coupled resonator waveguides (CRWs), i.e., SCC structures, with equal coupling coefficients have large amplitude oscillations and dispersion in the resonant passband, while SCC filters with a properly apodized coupling coefficient distribution have near-unity transmission in the passband, but both retain large dispersion due to the Kramers-Kronig constraint. It has previously been shown (for example in J. B. Khurgin, "Expanding the bandwidth of slow-light photonic devices based on coupled resonators," Mar. 1, 2005/Vol. 30, No. 5/OPTICS LETTERS, pp. 513) that adding individual side-coupled cavities to a CRW can cancel the lowest-order dispersion term in the input-to-drop-port response. The present structure 130 provides optimally flattened dispersion to high order in the sense of the equidistant linear-phase polynomial, and uses no extra resonators. Along with linearized phase, the structure 130 also simultaneously provides a unity amplitude transmission in the passband unlike linear-phase Bessel filters. Bessel filters are the best that an all-pole filter can do in terms of achieving linear phase in the passband, but they necessarily sacrifice amplitude response by having a rounded passband (rather than flat).

Figure 13C:
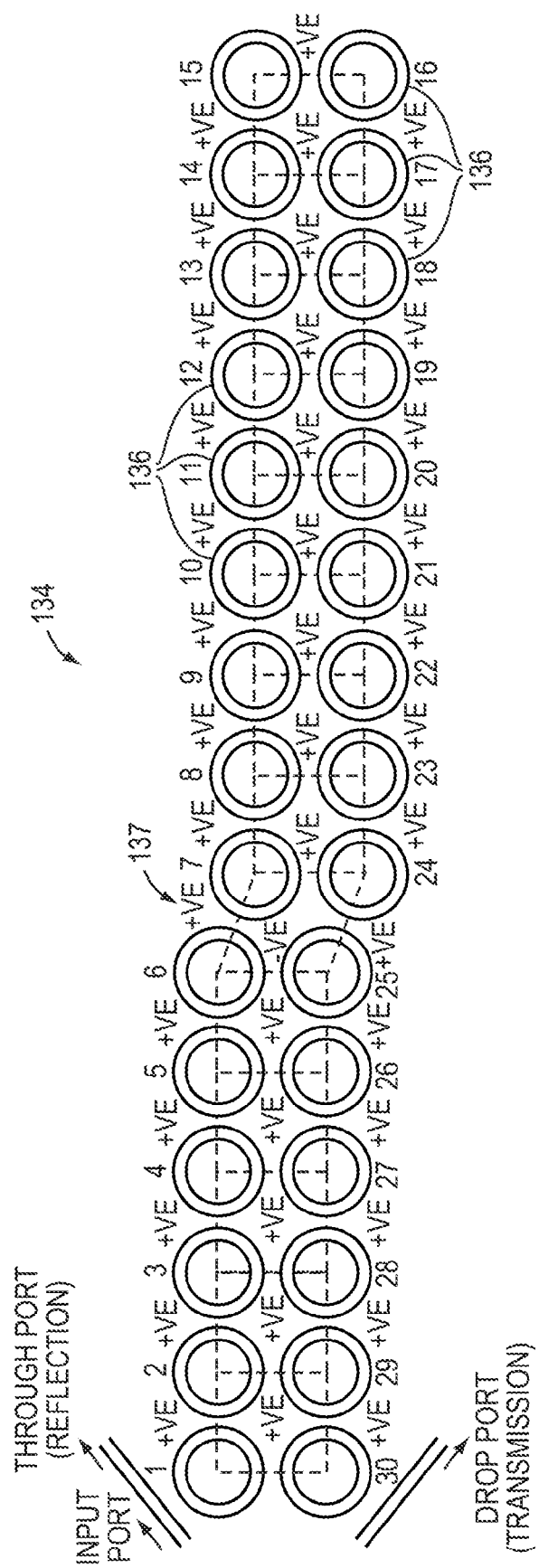
FIG. 13c illustrates a $30^{th}$-order structure in microring-resonator technology in accordance with an embodiment of the invention.
Figure 14A:
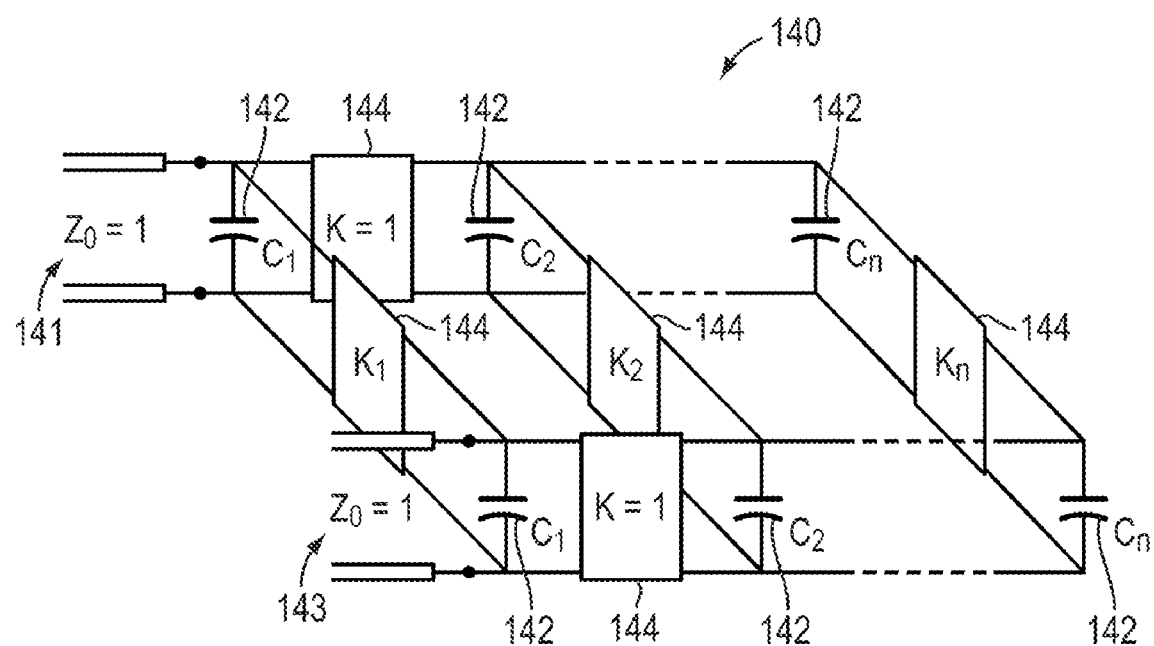
FIG. 14a illustrates one embodiment of an electric circuit that is topologically compatible with the structures depicted in FIGS. 13a-c.

The design of a flat-top, linear-phase, high-order (30 cavities) resonant structure 134, depicted in FIG. 13c, is now described as another exemplary embodiment. An electrical circuit that gives a flat-top, linear phase response and gives the realization of its response function in the optical structure 134 depicted in FIG. 13c, by providing a mapping of the circuit's parameters to the relevant parameters of the optical structure 134, is also now described. To these ends, FIG. 14a shows one embodiment of an electric circuit prototype 140 that supports response functions with simultaneously optimally flattened passband amplitude and group delay in transmission, as derived from an "equidistant linear-phase polynomial" given in the literature. This electrical circuit 140 is topologically compatible with the optical coupled-cavity structure 134 depicted in FIG. 13c, each capacitor 142 being equivalent to a resonant cavity 136 of the structure 134. A correspondence exists between the coupled-mode theory in time (CMT) model of the optical filter 134 and the circuit equations of the low-pass prototype circuit 140 with "resonators" at zero resonant frequency (i.e., sole capacitors, which may be imagined to have an infinite inductance in parallel—an open circuit, such that the resonant frequency is zero, $1/\sqrt{LC}=0$).

Figure 14B:
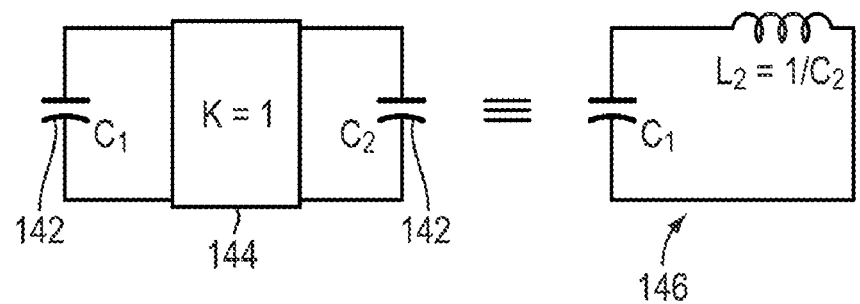
FIG. 14b illustrates that a pair of capacitors (each representing a resonator) connected by an immitance (impedance or admittance) inverter may be equivalent to an L-C resonator.

A mapping between electrical resonators and couple mode parameters can be found by physical arguments. The capacitors 142 may be considered as resonators at zero frequency, that is, having in parallel an inductor of infinite inductance, i.e., an open circuit, such that the resonance frequency $\omega_0=1$ $\sqrt{LC}=0$. By noting that the magnitudes of the CMT energy coupling coefficients, $\mu_{i,j}$, are real numbers in units of rad/s and that these real numbers represent the frequency of energy exchange between two energy storage elements, the circuit 140 may be mapped to the CMT model 134 by inspection by considering each part of the circuit 140 separately. FIG. 14b shows that a pair of capacitors 142 (each representing a resonator) connected by an immittance (impedance or admittance) inverter 144 is equivalent to an L-C resonator 146. The resonance frequency is the frequency of energy exchange between the two capacitors, i.e. resonators. In addition, referring again to FIG. 14a, an input port 141 is coupled to an input "resonator" 142 ($C_1$) and an output port 143 is coupled to an output "resonator" 142 ($C_1$). The decay rate of the input and output "resonators" 142 ($C_1$) is an R-C time constant formed by the capacitance and the characteristic impedance of the port (which may, without loss of generality, be assigned as $Z_0=1\Omega$, as illustrated in FIG. 14a). A prototype circuit 140 of the type shown in FIG. 14a may be obtained, for various filter responses of interest, from known literature, thus providing capacitor ($C_n$) and immittance inverter ($K_n$) values for the structure. The CMT parameters of the optical structure 134 that is equivalent to the circuit 140 depicted in FIG. 14 are given by:

$$\mu_{n,n+1}^2 = \mu_{N-n,N-n+1}^2 = \frac{1}{C_n C_{n+1}} \tag{5}$$

$$1/\tau_{in} = 1/\tau_{out} = \frac{1}{C_1}$$

$$\mu_{n,N-n+1} = \frac{K_n}{C_n}$$

for n=1 . . . N/2, where N is the filter order (number of cavities), with coupling coefficient indices in equation (5) referring to the numbering of the cavities 136 in the structure 134 of FIG. 13*c*.

Figure 15:
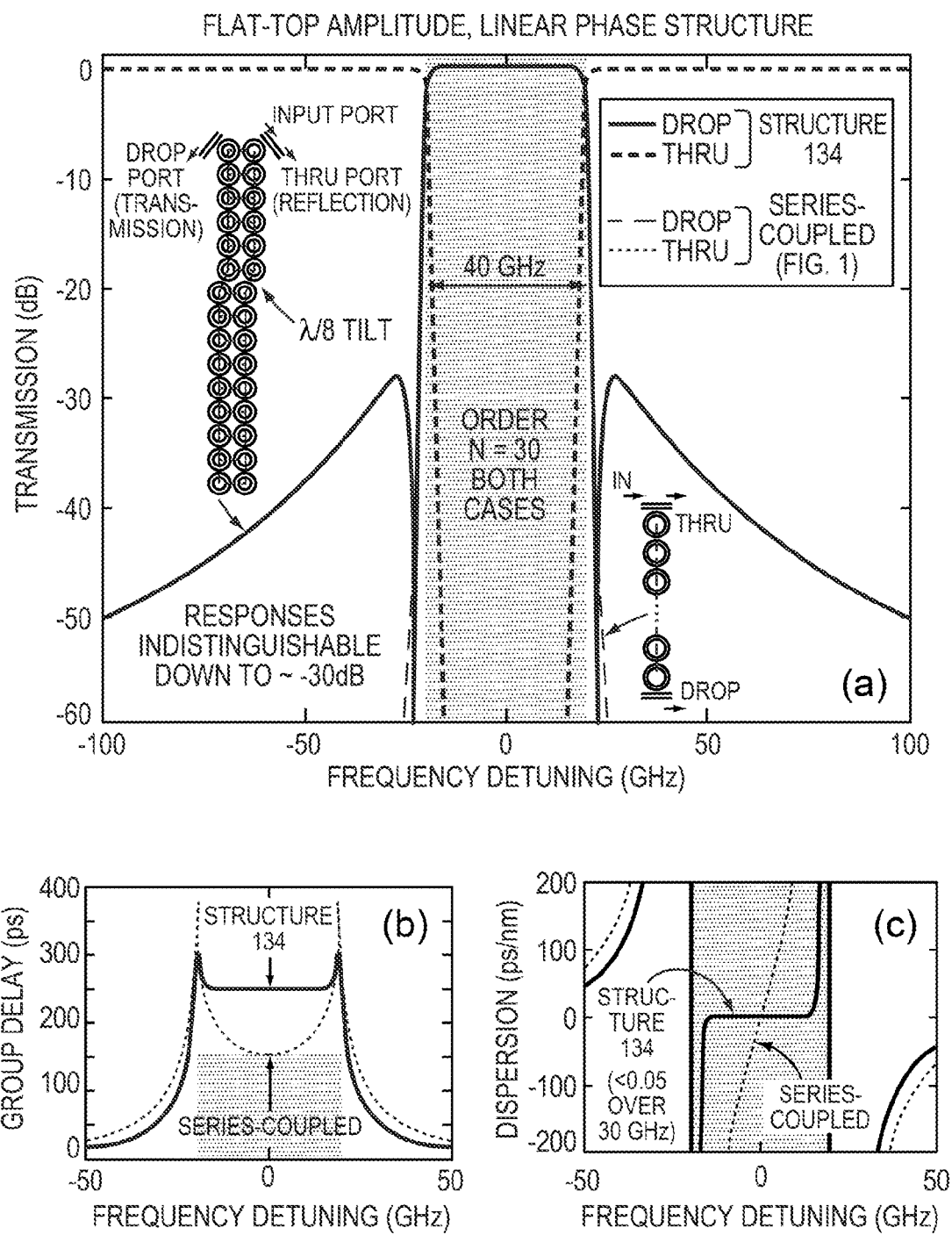
FIG. 15a is a graph that compares the resulting spectra of the structure depicted in FIG. 13c to that of a typical maximally-flat SCC filter.
FIG. 15b is a graph that compares the group delay response spectra of the structure depicted in FIG. 13c to that of a typical maximally-flat SCC filter.
FIG. 15c is a graph that compares the dispersion response spectra of the structure depicted in FIG. 13c to that of a typical maximally-flat SCC filter.

The graph of FIG. 15*a* compares the optical structure 134 depicted in FIG. 13*c* with a typical maximally-flat SCC filter (see FIG. 1), where both include 30 rings labeled 1, 2, 3, . . . 30 (i.e., are of order N=30). In one embodiment, both the optical structure 134 and the SCC filter are designed to have a 40 GHz 3dB bandwidth. In such a case, the normalized ECCs for the SCC filter may be: $\{2/\tau_{in}, \mu_{1,2}, \mu_{2,3}, \mu_{3,4}, \ldots, \mu_{29,30}, 2/\tau_{out}\}$={19.11, 30.54, 6.176, 2.696, 1.537, 1.011, 0.7295, 0.5619, 0.455, 0.3836, 0.3346, 0.3006, 0.2773, 0.2621, 0.2535, 0.2507, 0.2535, 0.2621, 0.2773, 0.3006, 0.3346, 0.3836, 0.455, 0.5619, 0.7295, 1.011, 1.537, 2.696, 6.176, 30.54, 19.11} rad/s, while the actual ECCs for a 40 GHz-wide design may be: {2401, 3838, 776.1, 338.8, 193.1, 127.1, 91.67, 70.61, 57.18, 48.21, 42.05, 37.77, 34.84, 32.93, 31.86, 31.51, 31.86, 32.93, 34.84, 37.77, 42.05, 48.21, 57.18, 70.61, 91.67, 127.1, 193.1, 338.8, 776.1, 3838, 2401} Grad/s.

The normalized ECCs (for a 2 rad/s full passband width) for the filter prototype used for the loop-coupled structure 134 of FIG. 13*c* may be, for the top row of couplings, left to right: $\{2/\tau_{in}, \mu_{1,2}, \mu_{2,3}, \mu_{3,4}, \ldots, \mu_{14,15}\}$={11.13, 3.241, 1.489, 1.016, 0.8002, 0.6808, 0.6083, 0.5623, 0.5325, 0.5125, 0.4949, 0.4675, 0.4201, 0.3503, 0.2521} rad/s; and for the vertical couplings, left to right: $\{\mu_{1,30}, \mu_{2,29}, \mu_{3,28}, \ldots, \mu_{15,16}\}$={−0.006747, −0.006618, −0.00631, −0.005695, −0.00448, −0.00204, 0.002908, 0.0127, 0.03041, 0.05671, 0.0831, 0.09419, 0.08752, 0.07632, 0.06901} rad/s. The actual ECCs for a 40 GHz bandwidth may be: for the top row, left to right: {1398.2, 407.3, 187.1, 127.7, 100.6, 85.55, 76.45, 70.66, 66.91, 64.41, 62.19, 58.75, 52.79, 44.03, 31.68}; for the vertical couplings, left to right: {−0.8478, −0.8316, −0.793, −0.7156, −0.5629, −0.2563, 0.3654, 1.595, 3.822, 7.126, 10.44, 11.84, 11, 9.591, 8.672}; and for the bottom row, the same as for the top row. Without loss of generality, in FIG. 13*c* all the top and bottom row ECCs, as well as the rightmost vertical coupling, are arbitrarily assigned as positive real. The signs of the remaining vertical couplings are directly related to the independent LCPs of the structure 134. This convention is used to permit mapping of the circuit 140 theory results directly to the optical structure 134. In order to accommodate the change of sign of the ECCs, there is a single coupling geometry kink 137 near the middle of the loop-coupled structure 134, representing an approximately $\frac{1}{8}^{th}$ guided wavelength tilt. By considering the LCP of each set of four adjacent rings 136 (two in the top row and two in the bottom row), it can be seen that all LCPs are zero, except for the coupling loop consisting of cavities 6, 7, 24, and 25, whose LCP is 180° due to the presence of the kink 137 in the structure 134 between the $6^{th}$ and $7^{th}$ cavity. In one embodiment, each coupling loop (other than the coupling loop consisting of cavities 6, 7, 24, and 25), in which all the rings in the coupling loop have equal radii, has a symmetric near-square (or, in the case where the coupling gaps are variable, trapezoidal) geometry in order to keep the LCPs of those coupling loops substantially equal to zero.

With reference again to FIG. 15*a*, the resulting spectra of the structure 134 depicted in FIG. 13*c* and of the typical maximally-flat SCC filter show that the passband flatness and near-passband rolloff of the two filters is the same. However, the loop-coupled structure 134, which uses the prototype circuit for equidistant linear phase filters, sacrifices rolloff beyond 30 dB extinction, in this case, to place finite transmission zeros (at complex-frequency detuning) that allow optimally flattened group delay, i.e., suppressed dispersion. The group delay response spectra of the structure 134 depicted in FIG. 13*c* and of the typical maximally-flat SCC filter are shown in FIG. 15*b* and their dispersion response spectra are shown in FIG. 15*c*. As illustrated, the difference between the two structures is very substantial. For example, the dispersion is less than 20 ps/nm (the typical telecom requirement for 10-40 Gb/s signals) over only 6% of the bandwidth in the standard SCC design, and over 80% of the bandwidth in the structure 134 depicted in FIG. 13*c*. Furthermore, the dispersion is less than 0.05 ps/nm over 75% of the passband width in the loop-coupled structure 134. A 25 ps pulse passing through the 40 GHz passband is delayed by about 10 pulse widths, with no substantial dispersion or pulse distortion.

For a chosen exemplary cavity FSR of 2 THz, typical for a microring resonator, the ECCs given above are translated to power coupling coefficients for the directional couplers. In such an embodiment, the final power coupling coefficients for the loop-coupled structure 134 depicted in FIG. 13*c* with a 40 GHz bandwidth and a 2 THz microring resonator FSR are as follows.

Referring to FIG. 13*c*, the top row of couplings is (left to right): $\{\kappa_{in}^2, \kappa_{12}^2, \kappa_{23}^2, \ldots, \kappa_{14,15}^2\}$={0.5066, 0.04063, 0.00871, 0.00407, 0.002524, 0.001828, 0.00146, 0.001247, 0.001119, 0.001036, 0.0009663, 0.0008626, 0.0006965, 0.0004844, 0.0002509}. Referring to FIG. 13*c*, the vertical couplings, left to right, are: $\{\kappa_{1,30}^2, \kappa_{2,29}^2, \kappa_{3,28}^2, \ldots, \kappa_{15,16}^2\}$={1.797e-007, 1.729e-007, 1.572e-007, 1.28e-007, 7.922e-008, 1.642e-008, 3.339e-008, 6.363e-007, 3.652e-006, 1.269e-005, 2.726e-005, 3.503e-005, 3.024e-005, 2.299e-005, 1.88e-005}. The bottom row of couplings is the same as the top row of couplings.

In one embodiment, the final power coupling coefficients for the typical maximally-flat SCC filter with a 40 GHz bandwidth and 2 THz FSR are, from input to output: $\{\kappa_{in}^2, \kappa_{12}^2, \kappa_{23}^2, \ldots, \kappa_{29,30}^2, \kappa_{out}^2\}$={0.7103, 0.1136, 0.02409, 0.01059, 0.006049, 0.003984, 0.002876, 0.002216, 0.001795, 0.001513, 0.00132, 0.001186, 0.001094, 0.001034, 0.001, 0.0009893, 0.001, 0.001034, 0.001094, 0.001186, 0.00132, 0.001513, 0.001795, 0.002216, 0.002876, 0.003984, 0.006049, 0.01059, 0.02409, 0.1136, 0.7103}. In this case, for example, the leading power coupling coefficient was about 1.2 prior to finite-FSR correction, i.e., above 100%. However, the proper FSR scaling using equation 3, set forth above, provides 0.71 as the correct coupling, and the resulting set of power coupling coefficients may be verified by simulation to produce the desired flat-top passband.

In general, the ECCs, as listed in the previous examples, scale linearly with passband width, so they are scaled to obtain different bandwidths. Equations (1) and (2), set forth above, may be applied to resonators having nonidentical FSRs. In this way, the same design may be scaled to various physical structures.

The specific examples given so far have been used to illustrate the utility of loop coupling, and of the engineering of the LCP(s). More generally, coupled-cavity structures that include an input waveguide and at least one output waveguide, and that are connected by a coupled-resonator system with non-trivial coupling loops, will introduce finite, complex-frequency transmission zeros into the input-to-drop response spectrum. Exemplary embodiments of such generic structures are illustrated in FIG. 16 using standing-wave cavities and in FIG. 17*a* using microring resonators.

Figure 16:
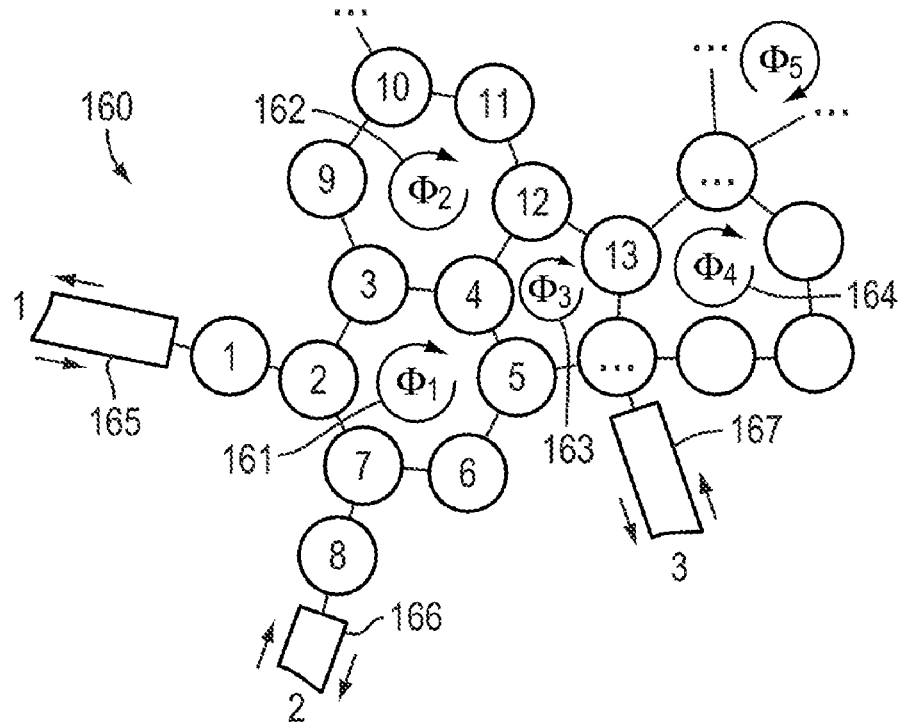
FIG. 16 illustrates a loop-coupled resonant structure using standing-wave cavities in accordance with an embodiment of the invention.

In the structure 160 depicted in FIG. 16, four coupling loops 161-164 are shown. With reference to coupling loop 161, the LCP $\Phi_1$=argument($\mu_{2,3} \cdot \mu_{3,4} \cdot \mu_{4,5} \cdot \mu_{5,6} \cdot \mu_{6,7} \cdot \mu_{7,2}$) is the phase of the product of six ECCs. For the standing-wave-resonator structures of FIG. 16, ports 165-167 include direct-coupled waveguides, in which there is an incoming (input-port) signal and an outgoing (through-port) signal as the forward and backward wave in the waveguide. It is assumed that the end of the waveguide is substantially reflective so that when there is no substantial energy in the input resonator, a substantial fraction of the input power is reflected, preferably all. An alternative, low-loss way to excite a single high-Q standing-wave cavity to accomplish this is by using a symmetric waveguide loop mirror 176, illustrated in FIG. 17b. As illustrated in FIG. 17c, by evanescently coupling the end 177 of the loop mirror 176, which has a standing wave excited, to a standing-wave cavity 178, and placing the cavity 178 such that the cavity mode and loop mirror standing wave pattern are not orthogonal, an efficient mechanism for exciting standing-wave structures is provided.

Figure 17A:
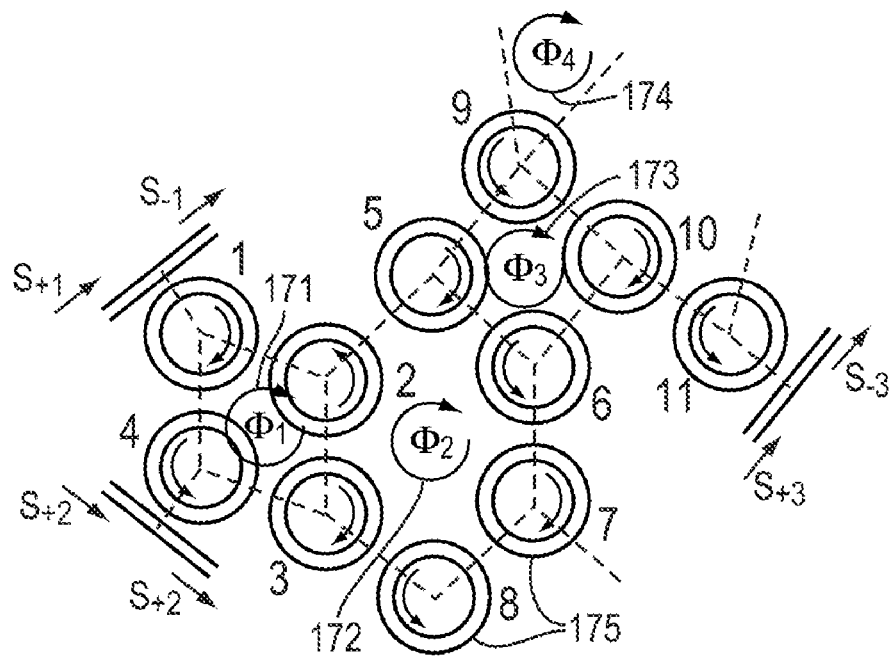
FIG. 17a illustrates a loop-coupled resonant structure using microring resonators in accordance with an embodiment of the invention.
Figure 17B:
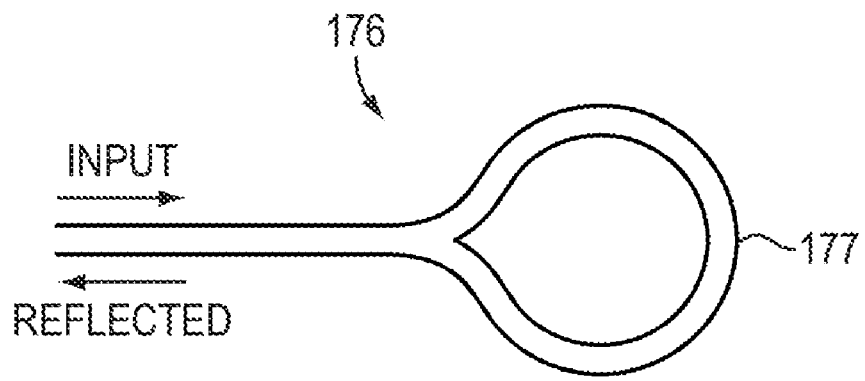
FIG. 17b illustrates a symmetric waveguide loop mirror in accordance with an embodiment of the invention.
Figure 17C:
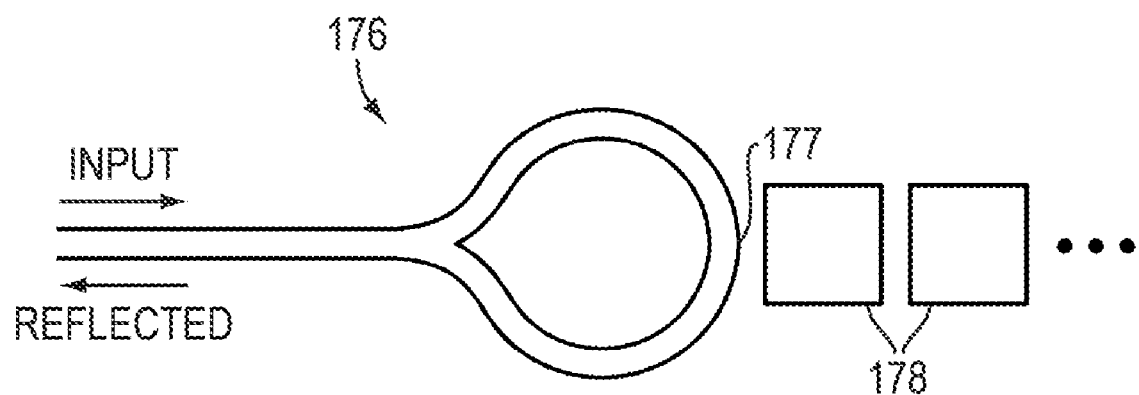
FIG. 17c illustrates the symmetric waveguide loop mirror of FIG. 17b coupled to a cavity in accordance with an embodiment of the invention.

FIG. 17a depicts one embodiment of a generic microring-resonator implementation of loop-coupled resonators. The non-trivial coupling loops 171-174 may each contain an even number of resonators 175, so as to avoid coupling to the degenerate, contradirectional modes (i.e., one resonance excited per cavity), when the system is excited by a signal entering a single input port. For the coupling loop 171, the LCP may be non-zero, e.g., 180°, if the tilt is approximately $\frac{1}{8}^{th}$ of the guided wavelength. In the case where the four coupling coefficient magnitudes in the coupling loop 171 are non-identical and employ different evanescent coupling gap widths, the geometry tilt angle required will be changed from $\frac{1}{8}^{th}$ wavelength and configured so as to still maintain a 180° LCP. If the coupling loop 171 is square and has approximately equal PCC magnitudes, the LCP is 0°. For coupling loops comprising a larger number of cavities, there is a larger number of adjustable degrees of freedom and the tilt angles may be chosen accordingly to provide a given LCP, as described in general.

An exemplary physical realization of the $4^{th}$-order loop-coupled structure 70 of FIG. 7 is depicted in FIGS. 18a-c, while an exemplary physical realization of a $4^{th}$-order standard SCC filter is depicted in FIGS. 19a-c. Both may be realized using a silicon-rich silicon nitride (refractive index n=2.2) ring waveguide core with a 900×400 nm cross-section, with silica (n=1.45) undercladding and air cladding on the top and sides of the core. An overetch of 100 nm (beyond the 400 nm core thickness) may be used when patterning the waveguides. All other planar dimensions and coordinates that may be used to realize the $4^{th}$-order loop-coupled structure 70 of FIG. 7 in the SiN material system are contained in FIG. 18b. For a zero LCP, the centers 181 of the rings 182 of the structure 70 depicted in FIG. 18c may be arranged on the vertices of a trapezoid (e.g., a rectangle) with a horizontal axis of symmetry. In the design in FIGS. 18a-c, the angles show a small tilt (of about 0.86°) in order to set a negative LCC, i.e. 180° LCP. This is because the SiN ring resonator, in the embodiment depicted, has 52 wavelengths in a round trip near 1550 nm free-space wavelength, so $\frac{1}{8}^{th}$ of a wavelength tilt is 360°/52/8~0.86°.

A physical realization of a $4^{th}$-order standard SCC filter 190 is depicted in FIGS. 19a-c for comparison. It is a standard Chebyshev filter, realized in a SCC-type structure. A large physical coupling gap of about 5 microns is introduced between rings 191 and 194 in order to make the coupling between rings 191 and 194 negligible, so that the structure 190 may be considered a SCC structure.

Figure 20:
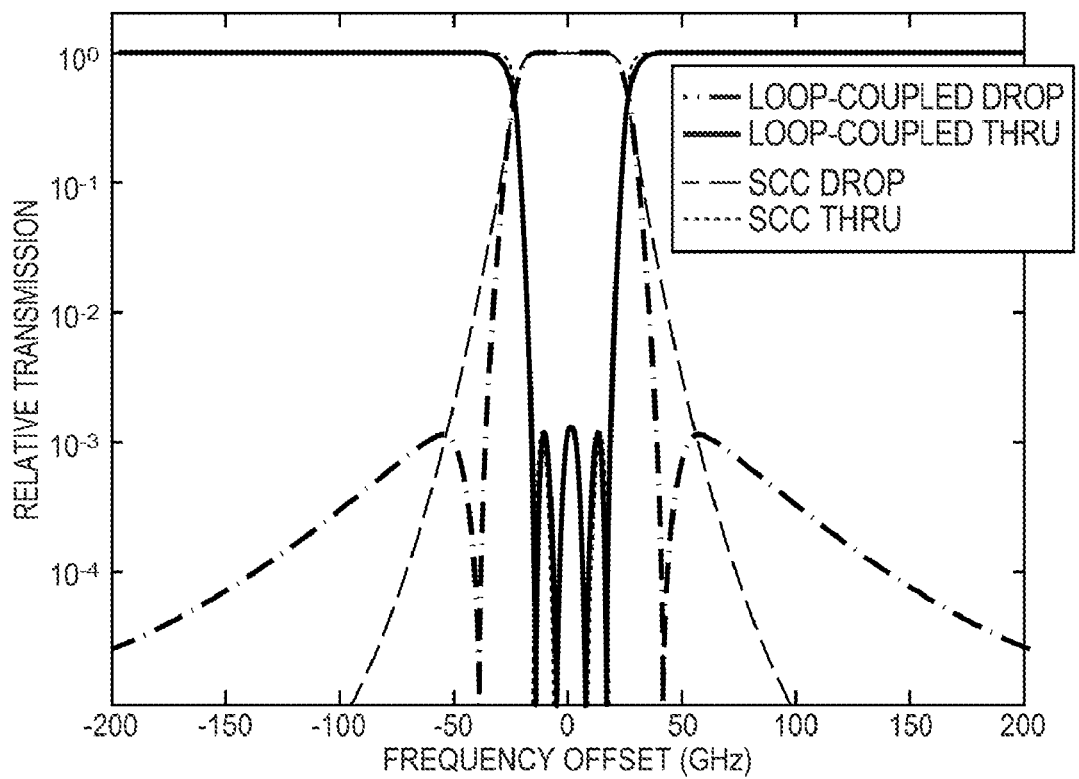
FIG. 20 is a graph that compares the simulated spectra of the devices depicted in FIGS. 18a-c to that of the devices depicted in FIGS. 19a-c, without excess waveguide loss.
Figure 21:
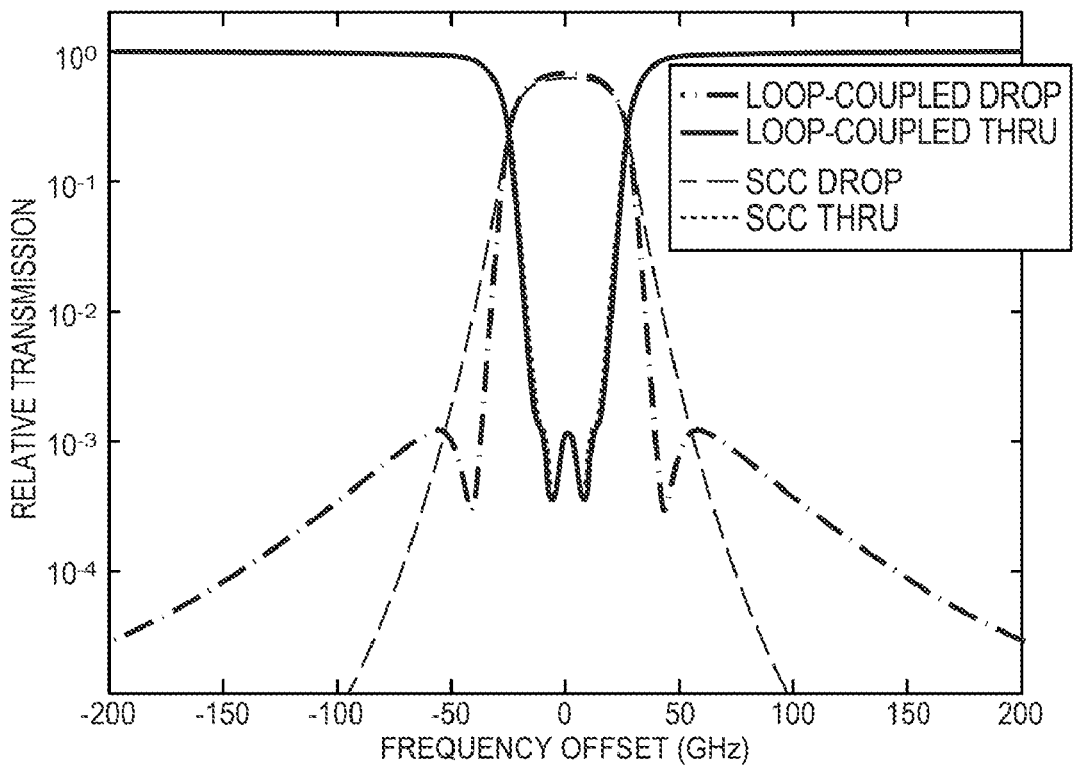
FIG. 21 is a graph that compares the simulated spectra of the devices depicted in FIGS. 18a-c to that of the devices depicted in FIGS. 19a-c, with the effect of waveguide loss added.

The devices 70, 190 depicted in FIGS. 18a-c and 19a-c, respectively, were simulated for comparison. Simulated spectra are shown in FIG. 20 without excess waveguide loss, and in FIG. 21 with the effect of waveguide loss added, corresponding to a loss Q for each cavity of about 40,000, which is a realizeable loss Q in many material systems. In the figure legends, spectral responses of the SCC structure 190 are marked as 'SCC', while those of the loop-coupled design 70 of the present invention are marked as "loop-coupled". FIG. 20 shows that for the same through-port extinction band of −30 dB across 40 nm, the loop-coupled device 70 has faster rolloff, as is also shown in FIG. 12. FIG. 21 shows that the introduction of transmission zeros permits the passband of the loop-coupled filter 70 to widen and lower the drop-port group delay slightly such that, for the same resonator losses, the filter drop loss is lower in the loop-coupled structure 70 than in the SCC structure 190.

Figure 22:
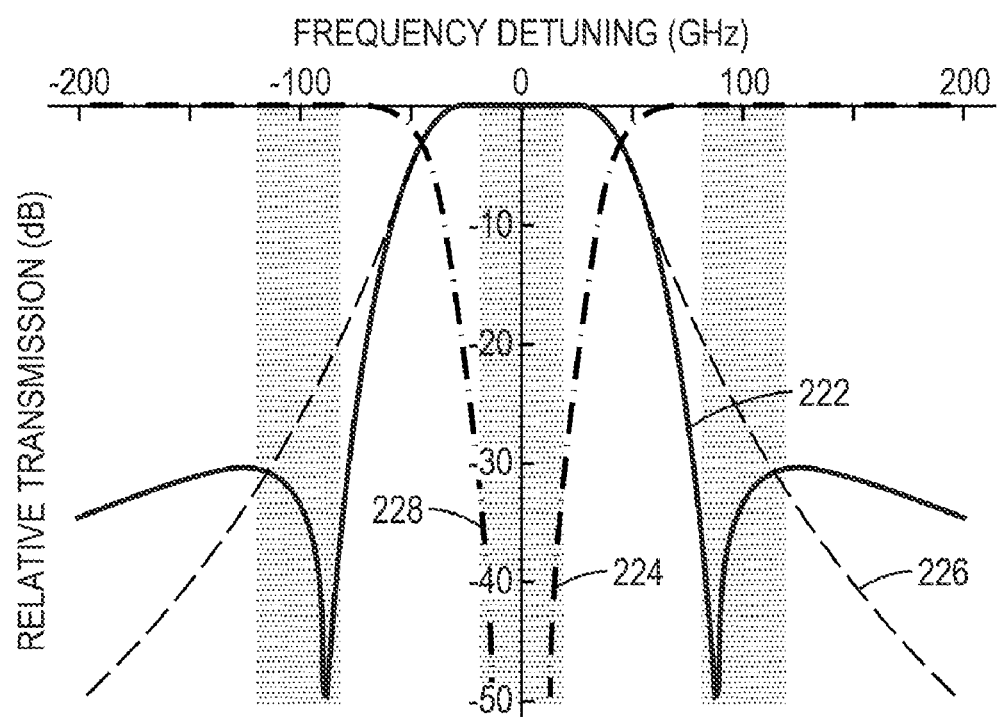
FIG. 22 is a graph that illustrates the drop and through port responses of an embodiment of the loop-coupled structure depicted in FIG. 7; the graph also illustrates a response of a standard Butterworth (maximally-flat) all-pole filter, implementable in a SCC structure.
Figure 23:
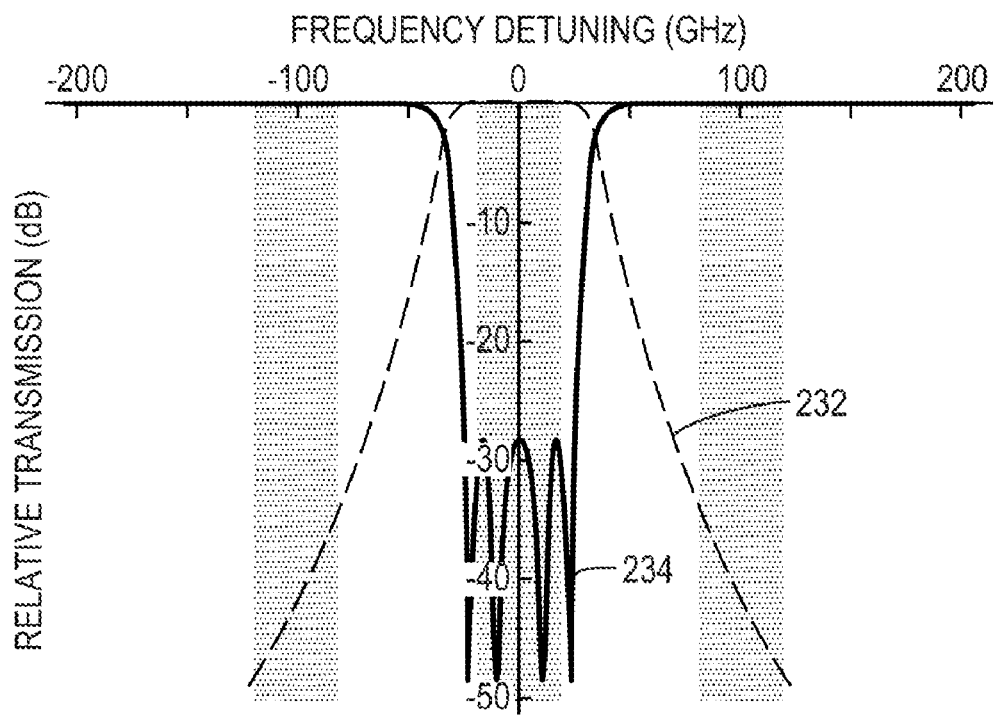
FIG. 23 is a graph that illustrates the response of an embodiment of a 4$^{th}$-order Chebyshev filter, using a SCC structure.

FIGS. 22-25 illustrate another advantage that may be attained in optical signal processing by using a loop coupled structure. FIG. 23 shows the drop (dashed line 232) and through (solid line 234) response of a $4^{th}$-order Chebyshev filter, using a SCC structure, designed to have a 40 GHz passband with 30 dB in-band extinction in the through port, and >30 dB rejection in the drop port at adjacent channels, with 100 GHz channel spacing.

FIG. 22 shows the drop (thick solid line 222) and through (thick long-dashed line 224) port responses of the loop-coupled structure 70 depicted in FIG. 7, where the transmission nulls were not used to make a sharper rolloff, but rather to widen, flatten, and round the edges of the passband. In such a fashion, the drop-port passband resembles a maximally-flat, Butterworth response, while the stopband of the drop port resembles a sharper rolloff due to zeros. This is similar to the inverse-Chebyshev (sometimes called Chebyshev Type II) filter response. Also shown for comparison in FIG. 22 are the drop (thin short-dashed line 226) and through (thin dash-dot line 228, which overlaps with the other through port 224) responses of a standard Butterworth (maximally-flat) all-pole filter, implementable in a SCC structure. It has the same passband shape, but shows clearly an insufficient rolloff rate, in comparison, to meet 30 dB rejection at the adjacent channel.

Figure 24:
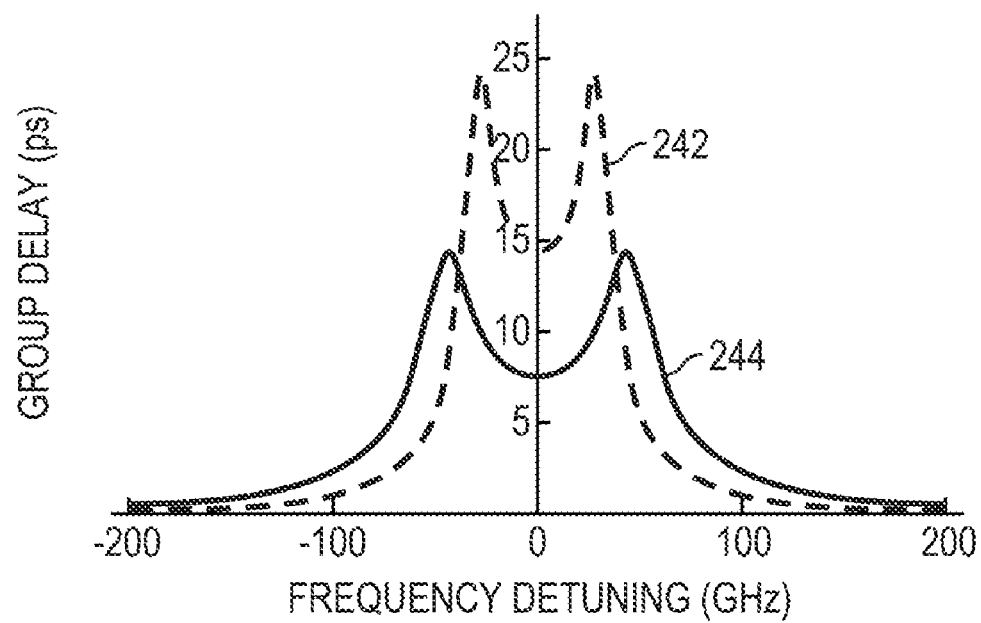
FIG. 24 is a graph that compares the group delay spectra of an embodiment of a 4$^{th}$-order Chebyshev filter, using a SCC structure, to that of the loop-coupled structure depicted in FIG. 7.
Figure 25:
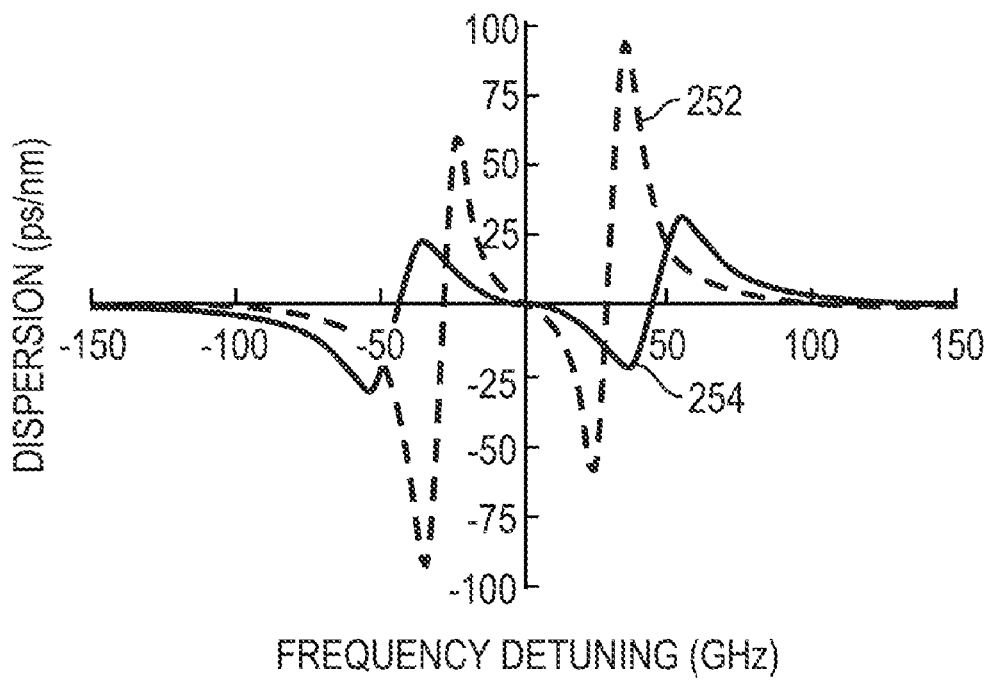
FIG. 25 is a graph that compares the dispersion spectra of an embodiment of a 4$^{th}$-order Chebyshev filter, using a SCC structure, to that of the loop-coupled structure depicted in FIG. 7.

FIG. 24 compares the group delay spectra (same for the drop ports and through ports) of the $4^{th}$-order Chebyshev filter (dashed line 242 in FIG. 24), whose amplitude response is illustrated in FIG. 23, to that of the loop-coupled structure 70 (solid line 244 in FIG. 24) depicted in FIG. 7. FIG. 25 compares the dispersion spectra (valid for the drop port and the through port responses) of the $4^{th}$-order Chebyshev filter (dashed line 252) to that of the loop-coupled structure 70 (solid line 254). The loop-coupled structure 70 shows less than 12 ps group delay in-band to the drop port across 40 GHz (FIG. 24), and less than 7 ps/nm in-band dispersion in the drop port (FIG. 25), as well as less than 7 ps/nm out-of-band dispersion in the through port at the edge of the adjacent channel, this being 80 GHz away from the channel center assuming 100 GHz channel spacing and a 40 GHz spectral width for each channel (FIG. 25). On the other hand, the standard Chebyshev filter shows 15-25 ps group delay in-band (FIG. 24), with 43 ps/nm maximum dispersion in the drop port in-band (FIG. 25), and 3 ps/nm maximum dispersion at the edge of the adjacent channel in the through port (FIG. 25). Therefore, for a slight increase in adjacent channel through port dispersion, the loop-coupled filter 70 reduces the drop-port dispersion by a factor of 6, while meeting the same spectral amplitude criteria, by permitting the widening of the passband. This is one approach by which loop-coupled filters may reduce filter dispersion. An alternative way, by making a phase-linearizing filter, was already described with reference to FIGS. 13-15.

The approach for obtaining N transmission zeros (per FSR) in an N-cavity system by coupling the input and output waveguides directly at a power fraction equal to the desired drop-port transmission level at large detunings is valid generally. More generally, the number of transmission zeros in the drop port is equal to N−M, if N is the number of cavities, and M is the smallest number of coupled cavities that must be traversed in going from the input port to the drop port.

Figure 26:
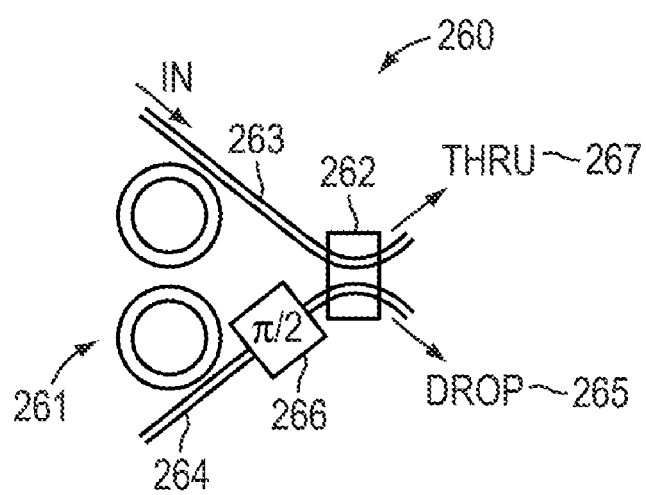
FIG. 26 illustrates a second-order filter in accordance with an embodiment of the invention.

FIG. 26 depicts one embodiment of another inventive device 260. The device 260 includes a standard SCC second-order resonator 261 coupling an input waveguide 263 to an output waveguide 264, followed by a directional coupler 262 optically coupling the input waveguide 263 to the output waveguide 264. Such a design permits the sharpness of the second order filter 260 to be increased.

Figure 27:
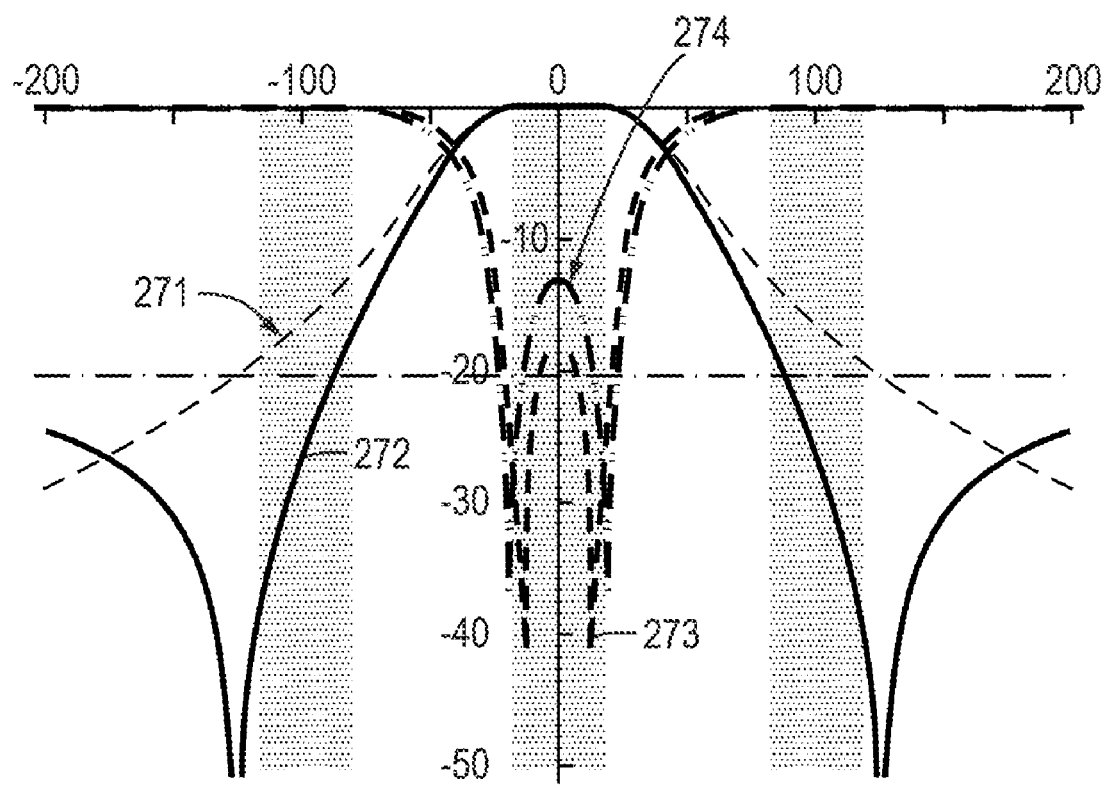
FIG. 27 is a graph that compares the drop and through responses of a standard SCC filter to those of the second-order filter depicted in FIG. 26.

FIG. 27 shows a standard SCC filter drop and through response (lines 271 and 274, respectively) and the drop and through responses of the device 260 (lines 272 and 273, respectively). By setting the directional coupler 262 of the device 260 at about 1% (−20 dB), the drop port 265 response rolloff is increased by about 4-5 dB, and the through-port 267 extinction is at the same time increased by 5 dB over the SCC filter. The coupling coefficients may be chosen so as to improve more the drop port 265 rolloff rate at the expense of smaller improvements in through-port 267 extinction or vice versa. The price paid for the improved selectivity is that there is no rolloff at large detuning since the filter 260 has 2 poles and 2 zeros, and levels off at −20 dB in the drop port 265. This response design may be accomplished by adding a 90° phase delay 266 in one waveguide 264, 263 in the region between the resonators 261 and the directional coupler 262, relative to the phase delay in propagating through the other waveguide 263,264 in the region between the resonators 261 and the coupler 262 (the lengths of the input and output waveguides 263, 264 from the resonators 261 to the directional coupler 262 otherwise being of substantially equal length). Filter responses such as the one depicted in FIG. 27 may be employed in channel add-drop filters in cascade geometries, where at least one filter is the filter 261 of structure 260, and other filters are standard SCC filters. By cascading the filter 261 of the structure 260 with a standard second-order SCC filter, a drop-port rolloff is obtained at large frequency detunings, while the rejection improvements achieved by direct coupling prevent substantial power loss in the first filter stage at the dropped or adjacent channel. This can be useful for providing multistage telecom-grade filter designs using only 2-ring filter stages, which are simpler to fabricate than higher order devices.

In one embodiment, the optical coupling between the input waveguide 263 and the output waveguide 264 introduced by the directional coupler 262 is substantially broadband over several passband widths. For example, the optical coupling may be substantially broadband over at least three passband widths, or over at least ten passband widths. In addition, it should be noted that any number of resonators 261 may be included in the filter 260, including a single resonator 261 or three or more resonators 261.

Figure 28:
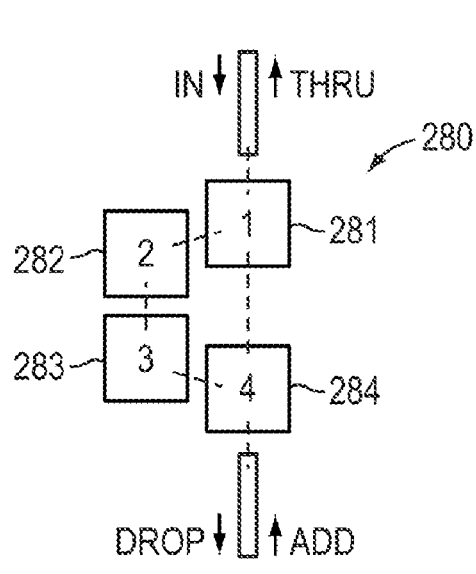
FIGS. 28-31 illustrate loop-coupled resonator based optical filters using standing wave resonators in accordance with various embodiments of the invention.
Figure 29:
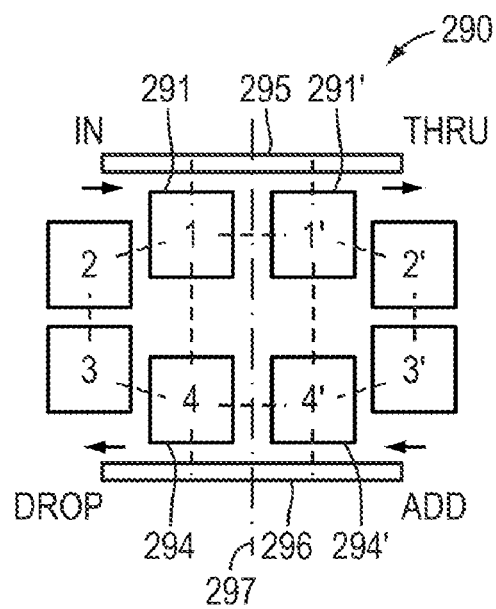

Referring to FIG. 28, a loop-coupled resonator based optical filter 280 is shown comprising four standing-wave resonators 281-284. An optical hybrid structure 290, with similar performance to the structure 70 based on loop-coupled ring resonators (depicted in FIG. 7), can be created using standing wave resonators as shown in FIG. 29. It is a combination of two of the resonant structures 280 shown in FIG. 28, with a mirror symmetry plane 297 between them as shown. In addition, to create matched ports, resonators 291 and 291' are coupled to each other and to an input waveguide 295 with separated input and through ports, and resonators 294 and 294' are coupled to each other and to an output waveguide 296 with separated drop and add ports. If the structure in FIG. 28 has a positive LCC (zero LCP), then the structure in FIG. 29 may be an optical hybrid with likewise a positive LCC (zero LCP).

Figure 30:
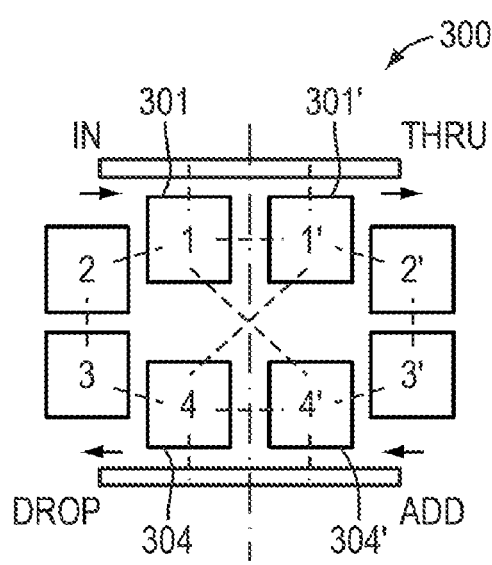
Figure 31:
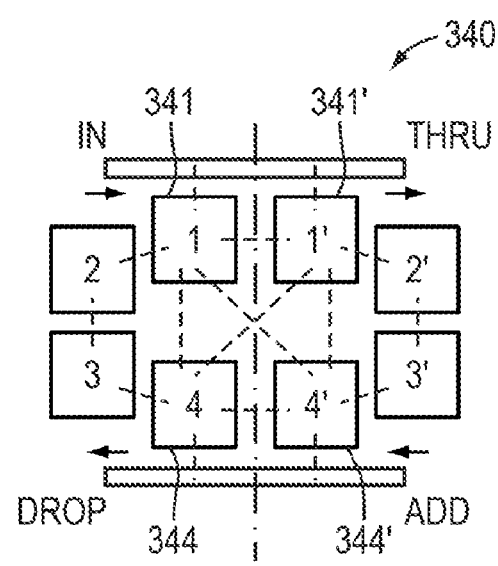

In FIG. 30, by coupling resonator 301 to 304', and 301' to 304, respectively, instead of 301 to 304 and 301' to 304' respectively, one may change the LCC from positive to negative (i.e. 180° LCP). In FIG. 31, by coupling resonator 341 to 344', and 341' to 344, respectively, as well as 341 to 341', and 344 to 344', respectively, one may obtain arbitrary LCP values in the optical hybrid device 340. Such arbitrary (i.e., not zero or 180° LCP values) may not be typically obtained in a standing-wave structure using reciprocal (i.e., no use of magnetooptic media) resonators in FIG. 28, while it may be obtained in FIG. 31 with reciprocal resonators. Arbitrary LCP was also shown to be achievable in embodiments of the invention that include ring resonator loop-coupled structures, such as the structure 70 depicted in FIGS. 7 and 8 and more generally shown in FIG. 6.

Figure 32:
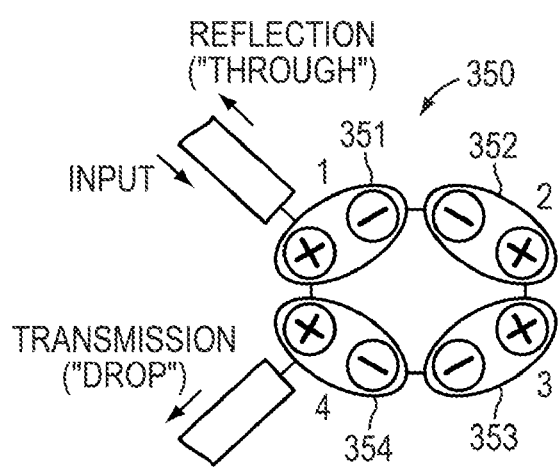
FIGS. 32-37 illustrate loop-coupled resonator based optical filters using standing wave cavities in accordance with various embodiments of the invention.
Figure 33:
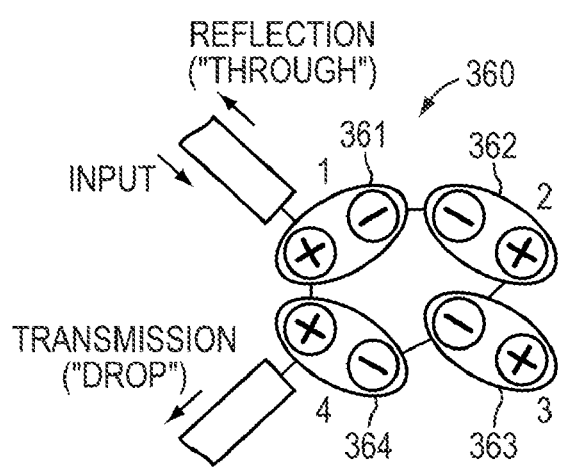

FIG. 32 shows a loop-coupled resonator based optical filter 350 comprising four cavities 351-354 each supporting a higher-order mode, and showing positive LCC (zero LCP). FIG. 33 shows a loop-coupled resonator based optical filter 360 with cavity 363 oriented so that the structure 360 has a negative LCC (180° LCP).

Figure 34:
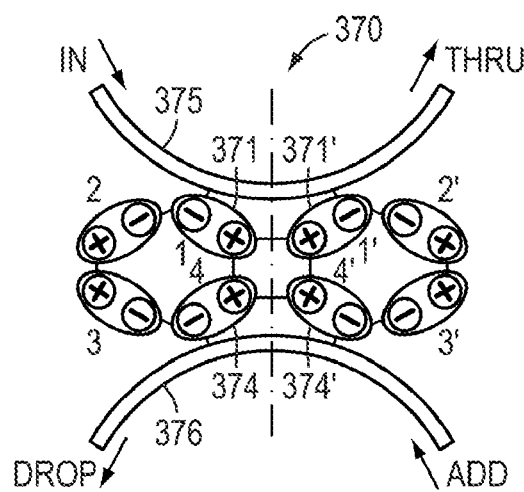

FIG. 34 shows an optical hybrid structure 370 that may show the same transmission characteristics as the loop-coupled structure 350 depicted in FIG. 32. It includes two of the loop-coupled structures 350 of FIG. 32, but has resonators 371 and 371' coupled to each other and to an input waveguide 375 with separated ports, and has resonators 374 and 374' coupled to each other and to an output waveguide 376 with separated ports to facilitate optical hybrid operation.

Figure 35:
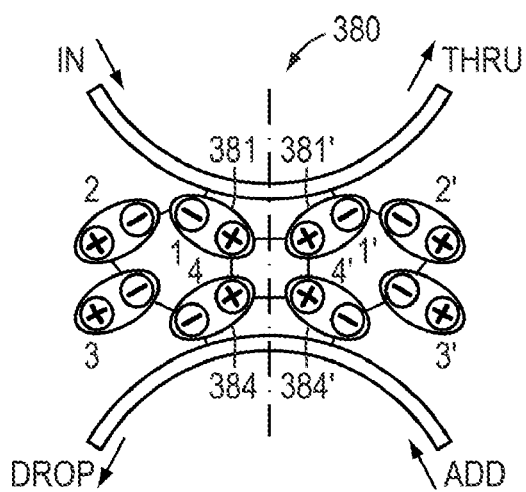
Figure 36:
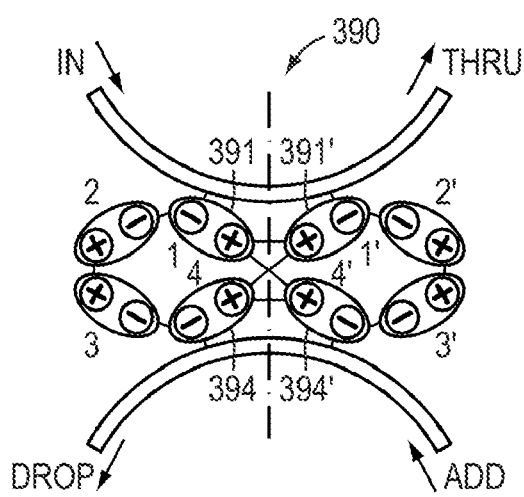

FIG. 35 shows an optical hybrid structure 380 that may show the same transmission characteristics as the loop-coupled structure 360 depicted in FIG. 33, i.e., the behavior of a loop-coupled structure with a single coupling loop having a negative LCC (180° LCP). An alternative way to form a negative LCC, using, for example, the cavity modes of loop-coupled structure 350 depicted in FIG. 32, is to replace to cavity couplings 381-384 and 381'-384' with couplings 381-384' and 381'-384, as shown for cavities 391, 391', 394, and 394' in FIG. 36.

Figure 37:
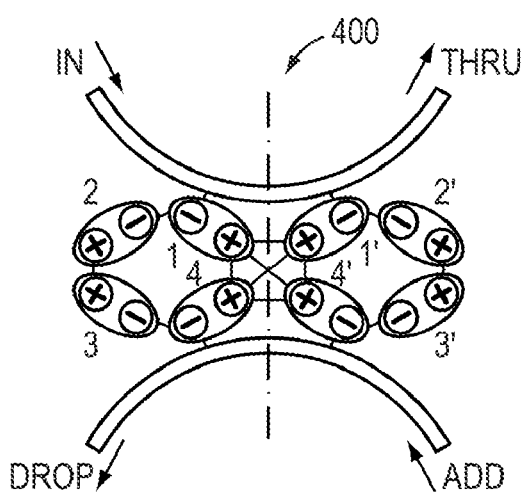

FIG. 37 shows an optical hybrid structure 400 that may show the same transmission characteristics as the loop-coupled structure 70 depicted in FIG. 7. In addition, the structure 400 may have arbitrary LCP, which may not typically be achieved in either structure 350 depicted in FIG. 32 or in structure 360 depicted in FIG. 33 if those structures include exclusively electromagnetically reciprocal resonators, as is typically the case.

Optical hybrid structures may similarly be created from other loop-coupled standing-wave cavity structures by converting each of the input and output waveguides from a waveguide that ends at the resonator, having substantially high reflection (ideally approaching 100%) when none of the resonators are excited (and thus having the through port as the reflected wave relative to the input port), to a waveguide with separated ports having no substantial reflection, and using two copies of the standing-wave loop coupled structure, the two copies being coupled to each other at those cavities that are coupled to access waveguides, and optionally having other cross-coupling. The optical hybrid, besides having a non-reflecting waveguide, in general has twice as many coupling loops as the non-hybrid standing-wave structure. Thus, the embodiments provided in the invention describe standing-wave structures, such as the structure 350 depicted in FIG. 32, having at least one coupling loop, and standing-wave-resonator optical hybrids (coupled at least twice to each waveguide) accordingly having at least two coupling loops. In one embodiment, in standing-wave-resonator optical hybrids, the double coupling to each waveguide is done to appropriately to set up traveling-wave-like excitation from the waveguide, i.e., the excitation of two modes with degenerate frequency and 90° out of phase, to simulate ring resonator operation. These designs may be used to produce an operation similar to a microring filter, such as that shown in FIG. 7, using, for example, photonic crystal (PhC) standing-wave microcavities. In various embodiments, the loop-coupled structures provided may be configured to have at least one coupling loop with zero, 180°, or another value of the loop-coupling phase (LCP), thereby permitting the engineering of transmission zeros as already illustrated in the given examples.

In summary, the structures presented herein enable filter responses that have, in certain embodiments, transmission-response (drop-port) zeros at complex-frequency detunings. The structures may include an input waveguide, at least one output waveguide, and a coupled-cavity system coupling the input and output waveguides. The coupled-cavity system may include cavity coupling loops, each with a loop-coupling phase determined by the geometry of the coupling loop. The loop coupling phase may be approximately 0 or 180° for standing wave resonators using high-order spatial modes, and may take on arbitrary values for reciprocal microring resonator structures operated with unidirectional excitation, or when standing- or traveling-wave resonators made of non-reciprocal (magnetooptic) media are used. By designing coupling loops with LCPs, and with the optional addition of a direct, phase-aligned coupling between the input and output port, the control of N poles and N zeros (per FSR) may be obtained in an N cavity filter. This allows for the design of optimum filters—in the sense of optimally sharp amplitude responses and non-minimum-phase designs permitting linear-phase or phase-engineered passbands—and for optical signal processing structures in a compact and robust implementation.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A loop-coupled resonator structure, comprising:
an input waveguide;
an output waveguide; and
a sequence of ring resonators coupling the input waveguide to the output waveguide, each ring resonator in the sequence being coupled to at least two other ring resonators in the sequence and an initial ring resonator in the sequence being coupled to a last ring resonator in the sequence so as to form a coupling loop,
wherein a coupling strength between a first ring resonator and a second ring resonator adjacent the first ring resonator is different from a coupling strength between the second ring resonator and a third ring resonator adjacent the second ring resonator.

2. The structure of claim 1, wherein the coupling loop comprises an associated loop coupling coefficient.

3. The structure of claim 2, wherein the loop coupling coefficient comprises an associated loop coupling phase.

4. The structure of claim 3, wherein the loop coupling phase is approximately 0 degrees.

5. The structure of claim 3, wherein the loop coupling phase is approximately 180 degrees.

6. The structure of claim 1, wherein each of the ring resonators of the coupling loop comprise a substantially equal ring radii.

7. The structure of claim 1, wherein the coupling loop comprises four ring resonators.

8. The structure of claim 7, wherein the four ring resonators forming the coupling loop are each centered at a different vertex of a rectangle.

9. The structure of claim 7, wherein the geometry of the coupling loop is tilted so that the four ring resonators forming the coupling loop are each centered at a different vertex of a parallelogram.

10. The structure of claim 9, wherein the geometry of the coupling loop is tilted by an angle equal to approximately ⅛ of the guided wavelength of a ring resonator in the coupling loop.

11. The structure of claim 1, wherein half of the ring resonators are arranged in a first row and half of the ring resonators are arranged in a second row adjacent the first row such that each ring resonator in the first row is coupled to at least one other ring resonator in the first row and to a ring resonator in the second row and each ring resonator in the second row is coupled to at least one other ring resonator in the second row and to a ring resonator in the first row.

12. The structure of claim 11, wherein the inter-row energy coupling coefficients of the ring resonators are weaker than the intra-row energy coupling coefficients of the ring resonators.

13. The structure of claim 1, wherein the output waveguide comprises a drop port and the loop-coupled resonator structure comprises a spectral response with transmission zeros in the drop port.

14. The structure of claim 1, wherein at least one ring resonator in the coupling loop only propagates light in a single direction.

15. The structure of claim 1, wherein the coupling loop comprises an even number of ring resonators.

16. The structure of claim 1, wherein at least one of the ring resonators is a microring resonator.

17. The structure of claim 1, wherein at least one of the ring resonators is a racetrack resonator.

18. A loop-coupled resonator structure, comprising:
an input waveguide comprising an input port;
an output waveguide comprising a drop port; and
a sequence of resonators coupling the input waveguide to the output waveguide, each resonator in the sequence being coupled to at least two other resonators in the sequence and an initial resonator in the sequence being coupled to a last resonator in the sequence so as to form a coupling loop,
wherein coupling coefficients for pairs of adjacent resonators are selected so that a spectral response from the input port to the drop port of the loop-coupled resonator structure comprises at least one passband and at least one discrete transmission zero placed outside the passband at finite complex frequency detuning from a center frequency of the passband.

* * * * *